United States Patent
Li et al.

(10) Patent No.: US 12,212,006 B2
(45) Date of Patent: Jan. 28, 2025

(54) ELECTRODE PLATE, ELECTROCHEMICAL DEVICE, AND APPARATUS

(71) Applicant: CONTEMPORARY AMPEREX TECHNOLOGY (HONG KONG) LIMITED, Hong Kong (CN)

(72) Inventors: Jing Li, Ningde (CN); Qingrui Xue, Ningde (CN); Wei Li, Ningde (CN); Zige Zhang, Ningde (CN); Yang Zhang, Ningde (CN); Yang Lu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 599 days.

(21) Appl. No.: 17/501,902

(22) Filed: Oct. 14, 2021

(65) Prior Publication Data
US 2022/0037669 A1 Feb. 3, 2022

Related U.S. Application Data

(63) Continuation of application No. PCT/CN2019/129356, filed on Dec. 27, 2019.

(30) Foreign Application Priority Data

Apr. 15, 2019 (CN) .......................... 201910299297.9

(51) Int. Cl.
*H01M 4/66* (2006.01)
*H01M 4/02* (2006.01)
(Continued)

(52) U.S. Cl.
CPC ............. *H01M 4/667* (2013.01); *H01M 4/13* (2013.01); *H01M 4/661* (2013.01); *H01M 4/662* (2013.01);
(Continued)

(58) Field of Classification Search
CPC ........ H01M 4/667; H01M 4/13; H01M 4/661; H01M 4/662; H01M 4/668; H01M 10/0525; H01M 2004/021
(Continued)

(56) References Cited

U.S. PATENT DOCUMENTS

| 4,492,021 A | 1/1985 | Wright |
| 5,478,676 A | 12/1995 | Turi et al. |

(Continued)

FOREIGN PATENT DOCUMENTS

| CN | 1579028 A | 2/2005 |
| CN | 1669163 A | 9/2005 |

(Continued)

OTHER PUBLICATIONS

Contemporary Amperex Technology Co., Limited, Extended European Search Report, EP19924692.7, Mar. 21, 2022, 4 pgs.
(Continued)

*Primary Examiner* — Christian Roldan
*Assistant Examiner* — Robert Gene West
(74) *Attorney, Agent, or Firm* — Kilpatrick Townsend & Stockton LLP

(57) ABSTRACT

This application relates to the battery field, and specifically, to an electrode plate, an electrochemical device, and an apparatus. The electrode plate of this application includes a current collector and an electrode active material layer disposed on at least one surface of the current collector, where the current collector includes a support layer and a conductive layer disposed on at least one surface of the support layer, a single-sided thickness D2 of the conductive layer satisfies 30 nm ≤ D2 ≤ 3 μm, the support layer is made of a polymer material or a polymer composite material, and a thickness D1 of the support layer satisfies 1 μm ≤ D1 ≤ 30 μm;
(Continued)

and the electrode active material layer includes an electrode active material, a binder, and a conductive agent.

15 Claims, 9 Drawing Sheets

(51) Int. Cl.
  *H01M 4/13* (2010.01)
  *H01M 10/0525* (2010.01)
(52) U.S. Cl.
  CPC ....... *H01M 4/668* (2013.01); *H01M 10/0525* (2013.01); *H01M 2004/021* (2013.01)
(58) Field of Classification Search
  USPC ........................................................ 429/245
  See application file for complete search history.

(56) References Cited

U.S. PATENT DOCUMENTS

| | | | |
|---|---|---|---|
| 5,645,959 | A | 7/1997 | Rowlette |
| 6,022,642 | A | 2/2000 | Tsukamoto |
| 6,420,066 | B1 | 7/2002 | Frustaci |
| 8,323,831 | B2 | 12/2012 | Wilkins |
| 8,691,445 | B2 | 4/2014 | Park |
| 8,785,053 | B2 | 7/2014 | Wang |
| 9,786,904 | B2 | 10/2017 | Park |
| 2002/0160265 | A1 | 10/2002 | Hashimoto |
| 2004/0126654 | A1 | 7/2004 | Sudano et al. |
| 2004/0126663 | A1 | 7/2004 | Sudano et al. |
| 2004/0258997 | A1 | 12/2004 | Utsugi |
| 2005/0221190 | A1 | 10/2005 | Sudano |
| 2006/0019168 | A1 | 1/2006 | Li |
| 2006/0105243 | A1 | 5/2006 | Okamura |
| 2006/0127773 | A1 | 6/2006 | Kawakami |
| 2006/0206186 | A1* | 9/2006 | Mori .................... A61N 1/0492 607/153 |
| 2006/0263691 | A1 | 11/2006 | Park |
| 2007/0224502 | A1 | 9/2007 | Affinito |
| 2009/0305135 | A1 | 12/2009 | Shi |
| 2010/0075223 | A1 | 3/2010 | Hwang |
| 2010/0075225 | A1 | 3/2010 | Wilkins |
| 2010/0129699 | A1 | 5/2010 | Mikhaylik |
| 2010/0291442 | A1 | 11/2010 | Wang |
| 2011/0200884 | A1 | 8/2011 | Uchida |
| 2012/0164528 | A1 | 6/2012 | Xu et al. |
| 2012/0208082 | A1 | 8/2012 | Honda |
| 2012/0237824 | A1 | 9/2012 | Koh |
| 2013/0045413 | A1 | 2/2013 | Wang |
| 2013/0171523 | A1 | 7/2013 | Chen |
| 2014/0072873 | A1* | 3/2014 | Wang .................... H01M 4/621 429/217 |
| 2014/0154580 | A1 | 6/2014 | Park |
| 2014/0162138 | A1 | 6/2014 | Fujiki |
| 2014/0291442 | A1 | 10/2014 | Laks et al. |
| 2014/0370349 | A1 | 12/2014 | Kwon |
| 2014/0370350 | A1 | 12/2014 | Kwon |
| 2015/0221452 | A1 | 8/2015 | Lida |
| 2015/0280241 | A1 | 10/2015 | Hara |
| 2016/0181620 | A1 | 6/2016 | Kim |
| 2016/0211524 | A1 | 7/2016 | Hao |
| 2016/0294015 | A1* | 10/2016 | Tanaka ................ H01M 50/586 |
| 2016/0351892 | A1 | 12/2016 | Sugimori |
| 2017/0033399 | A1 | 2/2017 | Fujisawa |
| 2017/0324077 | A1 | 11/2017 | Liu |
| 2017/0338493 | A1 | 11/2017 | Shin |
| 2017/0353585 | A1 | 12/2017 | Krishnan |
| 2018/0006291 | A1 | 1/2018 | Kim |
| 2018/0069229 | A1 | 3/2018 | Ko |
| 2018/0145317 | A1* | 5/2018 | Momma ............... H01M 4/625 |
| 2018/0198132 | A1 | 7/2018 | Liang |
| 2018/0205115 | A1 | 7/2018 | Haba |
| 2018/0219212 | A1 | 8/2018 | Seol |
| 2018/0287158 | A1 | 10/2018 | Ma |
| 2018/0301709 | A1 | 10/2018 | Qiu |
| 2019/0006658 | A1 | 1/2019 | Chae et al. |
| 2019/0173090 | A1 | 6/2019 | Liang |
| 2019/0173092 | A1 | 6/2019 | Liang |
| 2019/0245210 | A1* | 8/2019 | Matsushita ............. H01M 4/82 |
| 2019/0393511 | A1 | 12/2019 | Zhou |
| 2020/0083527 | A1 | 3/2020 | Nakamura |
| 2020/0083542 | A1 | 3/2020 | Yushin |
| 2020/0295377 | A1 | 9/2020 | Liang |
| 2020/0388875 | A1 | 12/2020 | Kano |
| 2020/0403247 | A1 | 12/2020 | Turi |
| 2021/0066691 | A1 | 3/2021 | Asai |
| 2021/0119196 | A1 | 4/2021 | Li |
| 2021/0119218 | A1 | 4/2021 | Li |
| 2021/0119221 | A1 | 4/2021 | Li |
| 2021/0151769 | A1 | 5/2021 | Li |
| 2021/0151772 | A1 | 5/2021 | Li |
| 2021/0167397 | A1 | 6/2021 | Kim |
| 2021/0210763 | A1 | 7/2021 | Li |
| 2021/0288329 | A1 | 9/2021 | Liang |
| 2021/0296654 | A1 | 9/2021 | Liang |
| 2021/0320322 | A1 | 10/2021 | Yasuda |
| 2022/0037663 | A1 | 2/2022 | Tamaki |
| 2022/0037667 | A1 | 2/2022 | Li |
| 2022/0037669 | A1 | 2/2022 | Li |
| 2022/0037670 | A1 | 2/2022 | Li |
| 2022/0037672 | A1 | 2/2022 | Xue |
| 2022/0093932 | A1 | 3/2022 | Li |

FOREIGN PATENT DOCUMENTS

| | | | | |
|---|---|---|---|---|
| CN | 1855588 | A | | 11/2006 |
| CN | 101071860 | A | | 11/2007 |
| CN | 101174685 | A | | 5/2008 |
| CN | 101207197 | A | | 6/2008 |
| CN | 101627494 | A | | 1/2010 |
| CN | 101884125 | A | | 11/2010 |
| CN | 2011165388 | A | | 8/2011 |
| CN | 102195032 | A | | 9/2011 |
| CN | 102306800 | A | | 1/2012 |
| CN | 102332558 | A | | 1/2012 |
| CN | 102569816 | A | | 7/2012 |
| CN | 102847859 | A | | 1/2013 |
| CN | 103131267 | A | | 6/2013 |
| CN | 103165863 | A | | 6/2013 |
| CN | 103268942 | A | | 8/2013 |
| CN | 103326029 | A | | 9/2013 |
| CN | 203218375 | U | | 9/2013 |
| CN | 103545530 | A | | 1/2014 |
| CN | 103779569 | A | | 5/2014 |
| CN | 103956499 | A | | 7/2014 |
| CN | 104303344 | A | | 1/2015 |
| CN | 104321907 | A | | 1/2015 |
| CN | 204088469 | U | | 1/2015 |
| CN | 103094619 | B | * | 2/2015 |
| CN | 104508896 | A | | 4/2015 |
| CN | 104659368 | A | * | 5/2015 .............. H01G 11/26 |
| CN | 104716328 | A | | 6/2015 |
| CN | 105027347 | A | | 11/2015 |
| CN | 105406083 | A | | 3/2016 |
| CN | 105489845 | A | | 4/2016 |
| CN | 105493323 | A | | 4/2016 |
| CN | 105514349 | A | | 4/2016 |
| CN | 105895193 | A | | 8/2016 |
| CN | 105958118 | A | | 9/2016 |
| CN | 106463698 | A | | 2/2017 |
| CN | 106654285 | A | | 5/2017 |
| CN | 106684319 | A | | 5/2017 |
| CN | 106848324 | A | | 6/2017 |
| CN | 106898729 | A | | 6/2017 |
| CN | 106910897 | A | * | 6/2017 ........ H01M 10/0525 |
| CN | 106935901 | A | | 7/2017 |
| CN | 106941149 | A | | 7/2017 |
| CN | 106981665 | A | | 7/2017 |
| CN | 107123812 | A | | 9/2017 |
| CN | 107154499 | A | | 9/2017 |
| CN | 107221676 | A | | 9/2017 |
| CN | 107240721 | A | | 10/2017 |
| CN | 107302094 | A | | 10/2017 |

(56) References Cited

FOREIGN PATENT DOCUMENTS

| | | | |
|---|---|---|---|
| CN | 107431186 | A | 12/2017 |
| CN | 107437622 | A | 12/2017 |
| CN | 107565137 | A | 1/2018 |
| CN | 107732146 | A | 2/2018 |
| CN | 107768677 | A | 3/2018 |
| CN | 107851836 | A | 3/2018 |
| CN | 207097950 | U | 3/2018 |
| CN | 104428928 | B | 4/2018 |
| CN | 107925056 | A | 4/2018 |
| CN | 108110220 | A | 6/2018 |
| CN | 108155363 | A | 6/2018 |
| CN | 108199005 | A | 6/2018 |
| CN | 108258249 | A | 7/2018 |
| CN | 108281662 | A | 7/2018 |
| CN | 108306013 | A | 7/2018 |
| CN | 108539252 | A | 9/2018 |
| CN | 108598491 | A | 9/2018 |
| CN | 108666525 | A | 10/2018 |
| CN | 108682788 | A | 10/2018 |
| CN | 108832134 | A | 11/2018 |
| CN | 109004171 | A | 12/2018 |
| CN | 109103490 | A | 12/2018 |
| CN | 208298924 | U | 12/2018 |
| CN | 109216675 | A * | 1/2019 |
| CN | 109216703 | A | 1/2019 |
| CN | 109273668 | A | 1/2019 |
| CN | 208507818 | U | 2/2019 |
| CN | 109546154 | A | 3/2019 |
| CN | 109546204 | A | 3/2019 |
| CN | 109873160 | U | 6/2019 |
| CN | 109873161 | A | 6/2019 |
| CN | 109873163 | A | 6/2019 |
| CN | 109873164 | A | 6/2019 |
| CN | 109873166 | A | 6/2019 |
| CN | 208955108 | U | 6/2019 |
| CN | 110660957 | B | 12/2020 |
| CN | 110661001 | B | 12/2020 |
| EP | 1551070 | A1 | 7/2005 |
| EP | 2903063 | A1 | 8/2015 |
| EP | 3182487 | A1 | 6/2017 |
| EP | 3367485 | A1 | 8/2018 |
| EP | 3389122 | A1 | 10/2018 |
| EP | 3796423 | A1 | 3/2021 |
| EP | 3796436 | A1 | 3/2021 |
| JP | H1167277 | A | 3/1999 |
| JP | 2003282064 | A | 10/2003 |
| JP | 2003297353 | A | 10/2003 |
| JP | 2008258055 | A | 10/2008 |
| JP | 2010027530 | A | 2/2010 |
| JP | 2011165388 | A | 8/2011 |
| JP | 2013178953 | A | 9/2013 |
| JP | 2013254692 | A | 12/2013 |
| JP | 2015115233 | A | 6/2015 |
| JP | 2017021888 | A * | 1/2017 ......... H01M 4/0404 |
| JP | 2018049825 | A | 3/2018 |
| JP | 2018073723 | A | 5/2018 |
| JP | 2018156787 | A | 10/2018 |
| JP | 2018174107 | A | 11/2018 |
| JP | 2018190656 | A | 11/2018 |
| KR | 20140137660 | A | 12/2014 |
| KR | 20180000183 | A | 1/2018 |
| WO | 2008115168 | A2 | 9/2008 |
| WO | 2011029058 | A2 | 3/2011 |
| WO | 2012127561 | A1 | 9/2012 |
| WO | 2015020338 | A1 | 2/2015 |
| WO | 2018180742 | A1 | 10/2018 |
| WO | 2019109928 | A1 | 6/2019 |

OTHER PUBLICATIONS

Ningder Age New Energy Technology Co. Ltd., First Office Action, CN201910299297.9, Aug. 20, 2020, 16 Pgs.
Ningder Age New Energy Technology Co. Ltd., Supplementary Search Report, CN201910299297.9, Nov. 16, 2020, 2 Pgs.
The international search report received in the corresponding International Application PCT/CN2019/119739, mailed Jan. 14, 2020.
The written opinion of ISA received in the corresponding International Application PCT/CN2019/119739, mailed Jan. 14, 2020.
The extended European search report received in the corresponding European Application 19902406.8, mailed Aug. 5, 2021.
The first office action received in the corresponding Chinese Application 201811642323.5, mailed Jun. 3, 2020.
The non-final office action received in the corresponding U.S. Appl. No. 17/112,766, mailed Jan. 31, 2024.
The international search report received in the corresponding International Application PCT/CN2019/117142, mailed Feb. 3, 2020.
The written opinion of ISA received in the corresponding International Application PCT/CN2019/117142, mailed Feb. 3, 2020.
The first office action received in the corresponding Chinese Application 201811644245.2, mailed Jun. 9, 2020.
The extended European search report received in the corresponding European Application 19905423.0, mailed Sep. 10, 2021.
Pszczółkowski Bartosz et al: "A Comparative Analysis of Selected Methods for Determining Young's Modulus in Polylactic Acid Samples Manufactured with the FDM Method", Materials, vol. 15, No. 1, Dec. 25, 2021 (Dec. 25, 2021) , p. 149.
The first office action received in the corresponding European Application 19905423.0, mailed Feb. 6, 2023.
The final office action received in the corresponding U.S. Appl. No. 17/132,548, mailed Jun. 6, 2023.
The international search report received in the corresponding International Application PCT/CN2019/117143, mailed Mar. 11, 2020.
The written opinion of ISA received in the corresponding International Application PCT/CN2019/117143, mailed Mar. 11, 2020.
The extended European search report received in the corresponding European Application 19906208.4, mailed Sep. 10, 2021.
The first office action received in the corresponding Chinese Application 201811638645.2, mailed Jun. 16, 2020.
The third office action received in the corresponding Chinese Application 201811644244.8, mailed Jan. 12, 2021.
The extended European search report received in the corresponding European Application 19903066.9, mailed Jul. 19, 2021.
The non-final office action received in the corresponding U.S. Appl. No. 17/059,503, mailed Aug. 30, 2023.
The international search report received in the corresponding International Application PCT/CN2019/119717, mailed Jan. 23, 2020.
The written opinion of ISA received in the corresponding International Application PCT/CN2019/119717, mailed Jan. 23, 2020.
The first office action received in the corresponding Chinese Application 201811638405.2, mailed Jun. 9, 2020.
The extended European search report received in the corresponding European Application 19902246.8, mailed Nov. 29, 2021.
The first office action received in the corresponding European Application 19902246.8, mailed Jul. 1, 2022.
The non-final office action received in the corresponding U.S. Appl. No. 17/335,034, mailed Mar. 31, 2023.
The first office action received in the corresponding Chinese Application 201910580127.8, mailed Mar. 19, 2021.
The second office action received in the corresponding Chinese Application 201910580127.8, mailed Jun. 16, 2021.
The international search report received in the corresponding International Application PCT/CN2019/125061, mailed Mar. 12, 2020.
The written opinion of ISA received in the corresponding International Application PCT/CN2019/125061, mailed Mar. 12, 2020.
The first office action received in the corresponding Chinese Application 201910299179.8, mailed Sep. 2, 2020.
The second office action received in the corresponding Chinese Application 201910299179.8, mailed Dec. 9, 2020.
The international search report received in the corresponding International Application PCT/CN2019/129352, mailed Mar. 27, 2020.
The written opinion of ISA received in the corresponding International Application PCT/CN2019/129352, mailed Mar. 27, 2020.
The international search report received in the corresponding International Application PCT/CN2019/129354, mailed Mar. 26, 2020.
The written opinion of ISA received in the corresponding International Application PCT/CN2019/129354, mailed Mar. 26, 2020.

(56) References Cited

OTHER PUBLICATIONS

The first office action received in the corresponding Chinese Application 201910299937.6, mailed Sep. 1, 2020.
The extended European search report received in the corresponding European Application 19924802.2, mailed Apr. 26, 2022.
The first office action received in the corresponding European Application 19906208.4, mailed Mar. 6, 2023.
The first office action received in the corresponding Chinese Application 201811638781.1, mailed Jun. 4, 2020.
The extended European search report received in the corresponding European Application 19905422.2, mailed Sep. 9, 2021.
The international search report received in the corresponding International Application PCT/CN2019/117141, mailed Feb. 5, 2020.
The written opinion of ISA received in the corresponding International Application PCT/CN2019/117141, mailed Feb. 5, 2020.
The first office action received in the corresponding Chinese Application 201910299473.9, mailed Aug. 18, 2020.
The notice of allowance received in the corresponding Chinese Application 201910299473.9, mailed Oct. 18, 2021.
The extended European search report received in the corresponding European Application 19925225.5, mailed Mar. 22, 2022.
The non-final office action received in the corresponding U.S. Appl. No. 17/501,905, mailed Sep. 14, 2023.
The international search report received in the corresponding International Application PCT/CN2019/129357, mailed Jan. 23, 2020.
The written opinion of ISA received in the corresponding International Application PCT/CN2019/129357, mailed Jan. 23, 2020.
The international search report received in the corresponding International Application PCT/CN2019/129360, mailed Apr. 1, 2020.
The written opinion of ISA received in the corresponding International Application PCT/CN2019/129360, mailed Apr. 1, 2020.
Contemporary Amperex Technology Co., Limited, International Search Report and Written Opinion, PCT/CN2019/129356, Mar. 26, 2020, 18 pgs.
The extended European search report received in the corresponding European Application 19933228.9, mailed Sep. 30, 2021.
The first office action received in the corresponding Chinese Application 201910586647.X, mailed Jun. 16, 2023.
The notification to grant patent right for invention eceived in the corresponding Chinese Application 201910586647.X, mailed Aug. 15, 2023.
Matweb, Material Property Data Sheet for Aluminum, 2021.
The non-final office action received in the corresponding U.S. Appl. No. 17/139,124, mailed Mar. 19, 2021.
The non-final office action received in the corresponding U.S. Appl. No. 17/139,124, mailed Aug. 10, 2022.
Matweb, Datasheet for Aluminum, 2022.
The final office action received in the corresponding U.S. Appl. No. 17/139,124, mailed Apr. 11, 2022.
The notice of allowance received in the corresponding U.S. Appl. No. 17/139,124, mailed Aug. 23, 2023.
The international search report received in the corresponding International Application PCT/CN2019/119700, mailed Feb. 19, 2020.
The written opinion of ISA received in the corresponding International Application PCT/CN2019/119700, mailed Feb. 19, 2020.
The extended European search report received in the corresponding European Application 19902910.9, mailed Jul. 8, 2021.
The first office action received in the corresponding Chinese Application 201811637655.4, mailed Jun. 16, 2020.
The third office action received in the corresponding Chinese Application 201811638645.2, mailed Sep. 18, 2021.
Eunice K Wong et al:"Battery Separator Characterization and Evaluation Procedures for NASA's Advanced Lithium-Ion Batteries", published May 1, 2010.
Pszczolkowski Bartosz et al:"A Comparative Analysis of Selected Methods for Determining Young's Modulus in Polylactic Acid Samples Manufactured with the FDM Method" Materials, vol. 15, No. 1, Dec. 25, 2021 (Dec. 25, 2021), p. 149, XP093019570, DOI: 10.3390/ma15010149.
"Temperature-Compensated Crystal Oscillator" Elektor Electronics Elektor Electronics GB vol. 25, No. 279, Jul. 1, 1999, p. 54/55.
The Non-Final Office Action received in the counterpart U.S. Appl. No. 17/059,503, mailed on Jun. 21, 2024.

\* cited by examiner

ELECTRODE PLATE, ELECTROCHEMICAL DEVICE, AND APPARATUS

CROSS-REFERENCE TO RELATED APPLICATIONS

This application is a continuation application of PCT Patent Application No. PCT/CN2019/129356, entitled "ELECTRODE SHEETS, ELECTROCHEMICAL DEVICE AND DEVICE" filed on Dec. 27, 2019, which claims priority to Chinese Patent Application No. 201910299297.9, filed with the State Intellectual Property Office of the People's Republic of China on Apr. 15, 2019, and entitled "ELECTRODE PLATE AND ELECTROCHEMICAL DEVICE", all of which are incorporated herein by reference in their entirety.

TECHNICAL FIELD

This application relates to the battery field, and specifically, to an electrode plate, an electrochemical device, and an apparatus.

BACKGROUND

Lithium-ion batteries are widely applied to electric vehicles and consumer electronic products due to their advantages such as high energy density, high output power, long cycle life, and low environmental pollution. With continuous expansion of the application scope of the lithium-ion batteries, requirements for mass energy density and volumetric energy density of the lithium-ion batteries are increasingly high. In order to obtain a lithium-ion battery with higher mass energy density and volumetric energy density, the following improvements are usually made to the lithium-ion battery: (1) selecting a positive electrode material or a negative electrode material with a high specific discharge capacity; (2) optimizing a mechanical design of the lithium-ion battery to minimize its volume; (3) selecting a positive electrode plate or a negative electrode plate with high compacted density; and (4) reducing weight of components of the lithium-ion battery.

A current collector is typically improved by selecting a lighter or thinner current collector. For example, a perforated current collector or a plastic current collector (composite current collector) with a metal coating layer may be used. For an electrode plate and a battery using a plastic current collector with a metal coating layer, although the energy density is increased, some performance degradation may occur in processing performance, electrochemical performance, and the like. To obtain an electrode plate and a current collector with good electrochemical performance, improvements in many aspects are still required. This application is hereby proposed to overcome disadvantages in the prior art.

SUMMARY

In view of this, this application provides an electrode plate, an electrochemical device, and an apparatus.

According to a first aspect, this application relates to an electrode plate, including a current collector and an electrode active material layer disposed on at least one surface of the current collector, where the current collector includes a support layer and a conductive layer disposed on at least one surface of the support layer, a single-sided thickness D2 of the conductive layer satisfies 30 nm≤D2≤3 µm, the support layer is made of a polymer material or a polymer composite material, and a thickness D1 of the support layer satisfies 1 µm≤D1≤30 µm; and the electrode active material layer includes an electrode active material, a binder, and a conductive agent, when viewed in a width direction of the coated surface of the electrode plate, the electrode active material layer includes three zones classified by compacted density, and compacted density of a middle zone is greater than compacted density of zones on both sides.

According to a second aspect, this application relates to an electrochemical device, including a positive electrode plate, a negative electrode plate, a separator, and an electrolyte, where the positive electrode plate and/or the negative electrode plate is the electrode plate according to the first aspect of this application.

According to a third aspect, this application relates to an apparatus, including the electrochemical device according to the second aspect of this application.

The technical solutions of this application have at least the following beneficial effects:

First, the electrode plate in this application uses a composite current collector. Because the composite current collector has a relatively thin conductive layer and the support layer is made of a polymer material or a polymer composite material, energy density such as mass energy density of the electrochemical device can be significantly improved.

Second, the composite current collector generates relatively small metal fins in an abnormal case such as nail penetration due to its relatively thin conductive layer, and has greater short-circuit resistance than that of a conventional metal current collector in the abnormal case such as nail penetration due to its support layer having a polymer material or a polymer composite material. Therefore, nail penetration safety performance of the electrochemical device is greatly improved.

Third, the electrode active material layer includes three zones classified by compacted density, and therefore can effectively suppress curvature and edge warpage of the composite current collector and the electrode plate caused by roll-in and the like. This ensures that the electrode plate maintains better flatness after roll-in, and helps protect the conductive layer from damage, thereby ensuring good electrochemical performance of the electrode plate.

That is, the electrode plate of this application has excellent processing performance, and can also improve the electrochemical performance and safety of the corresponding electrochemical device.

In addition, according to the electrode plate in some embodiments of this application, a conductive primer layer including a conductive material and a binder is also additionally disposed between the composite current collector and the electrode active material layer. The conductive primer layer can further improve the binding force between the active material layer and the composite current collector, and by effectively mending and constructing a conductive network among the current collector, the conductive primer layer, and the active material, can also improve electron transfer efficiency, and reduce resistance between the current collector and the electrode active material layer, thereby overcoming disadvantages such as a relatively poor conductive capability of the composite current collector and damage vulnerability of the conductive layer in the composite current collector. In this way, the internal direct current resistance in the electrode assembly can be effectively reduced, the power performance of the electrode assembly is improved, and it is ensured that the electrode assembly is not prone to phenomena such as relatively large polarization and lithium precipitation during long-term cycling. That is, the long-term reliability of the electrode assembly is effectively improved.

In addition, a binder content of the electrode active material layer of the electrode plate in some embodiments of this application is preferably not less than 1 wt %, more preferably, not less than 1.5 wt %, and most preferably, not less than 2 wt %, so that the binding force between the active material layer and the composite current collector is strengthened, and in abnormal cases such as nail penetration, the active material layer can effectively wrap metal fins generated in the conductive layer so as to better improve nail penetration safety performance of the battery.

The apparatus in this application includes the electrochemical device according to the second aspect of this application, and therefore, has at least the same advantages as the electrochemical device.

Therefore, the electrode plate of this application has excellent processing performance, the electrochemical device (for example, the lithium-ion battery) and the apparatus including the electrode plate have good energy density, electrochemical performance, and safety performance.

BRIEF DESCRIPTION OF DRAWINGS

The following describes an electrode plate, an electrochemical device, an apparatus, and beneficial effects thereof in this application in detail with reference to the accompanying drawings and embodiments.

Figure 1:
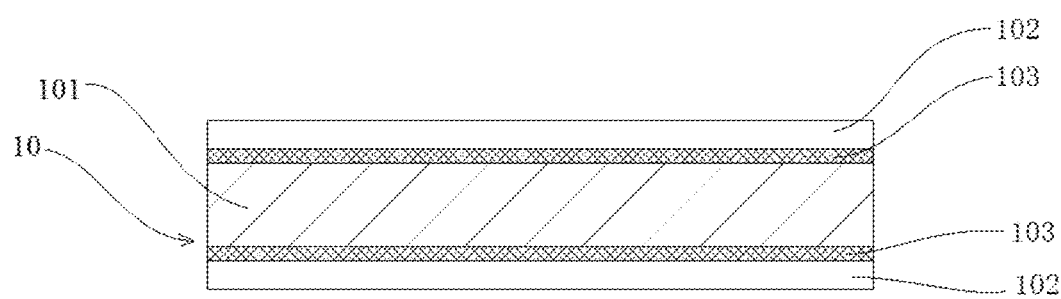
FIG. 1 is a schematic structural cross-sectional view of a positive electrode current collector according to an embodiment of this application.

In which,
PP. positive electrode plate;
   10. positive electrode current collector;
     101. positive electrode support layer;
     102. positive electrode conductive layer;
     103. positive electrode protective layer;
   12. conductive primer layer;
   11. positive electrode active material layer;
NP. negative electrode plate;
   20. negative electrode current collector;
     201. negative electrode support layer;
     202. negative electrode conductive layer;
     203. negative electrode protective layer;
   22. conductive primer layer;
   21. negative electrode active material layer;
   511. tab;
   512. clear zone;
   513. first low compacted zone;
   514. high compacted zone;
   515. second low compacted zone;
1. battery pack;
2. upper battery box;
3. lower battery box;
4. battery module; and
5. electrochemical device.

DESCRIPTION OF EMBODIMENTS

The following further describes this application with reference to embodiments. It should be understood that these embodiments are merely intended to illustrate this application but not to limit the scope of this application.

The first aspect of this application relates to an electrode plate, including a current collector and an electrode active material layer disposed on at least one surface of the current collector, where the current collector includes a support layer and a conductive layer disposed on at least one surface of the support layer, a single-sided thickness D2 of the conductive layer satisfies 30 nm≤D2≤3 μm, the support layer is made of a polymer material or a polymer composite material, and a thickness D1 of the support layer satisfies 1 μm≤D1≤30 μm; and the electrode active material layer includes an electrode active material, a binder, and a conductive agent, when viewed in a width direction of the coated surface of the electrode plate, the electrode active material layer includes three zones classified by compacted density, and compacted density of the middle zone is greater than compacted density of the zones on both sides.

Obviously, the electrode plate may be a positive electrode plate or a negative electrode plate. When the electrode plate is a positive electrode plate, correspondingly, the current collector and the electrode active material layer therein are a positive electrode current collector and a positive electrode active material layer, respectively. When the electrode plate is a negative electrode plate, correspondingly, the current collector and the electrode active material layer therein are a negative electrode current collector and a negative electrode active material layer, respectively.

The current collector used for the electrode plate according to the first aspect of this application is a composite current collector, and the composite current collector is formed by at least two materials. In terms of a structure, the current collector includes a support layer and a conductive layer disposed on at least one surface of the support layer, and a single-sided thickness D2 of the conductive layer satisfies 30 nm≤D2≤3 μm. Therefore, it is the conductive layer of the current collector that serves for conducting electricity. The thickness D2 of the conductive layer is far less than thickness of a metal current collector such as Al foil or Cu foil commonly used in the prior art (the thickness of commonly used Al foil and Cu foil metal current collector is usually 12 μm and 8 μm). Therefore, mass energy density and volumetric energy density of the electrochemical device (for example, a lithium battery) using the electrode plate can be increased. In addition, when the composite current collector is applied to the positive electrode current collector, nail penetration safety performance of the positive electrode plate can also be greatly improved. This is because the composite current collector is provided with a relatively thin conductive layer. Therefore, in an abnormal case such as nail penetration, metal fins generated are relatively small. In addition, the composite current collector also has a support layer made of a polymer material or a polymer composite material. Therefore, short-circuit resistance is greater than that of a conventional metal current collector in the abnormal case such as nail penetration. These factors jointly greatly improve nail penetration safety performance of the electrochemical device.

However, the support layer of the composite current collector is made of a polymer material or a polymer composite material, and therefore has a greater rebound degree than that of the conventional metal current collector in an electrode plate processing (for example, processes such as roll-in) process. Therefore, if coating is performed on the current collector and then compacting is performed in a roll-in process according to a conventional process, a series of problems may arise. Due to the rebound of the support layer, edges on both sides of the electrode plate are warped upward, and as a result, the entire electrode plate has a curvature, thereby causing deformation of the electrode plate. The deformation of the electrode plate may cause separation between the electrode active material layer and the composite current collector, breakage of the conductive layer, peeling of the conductive layer from the support layer, and the like, thereby deteriorating the electrochemical performance of the electrode plate. In addition, the deformation of the electrode plate also makes the positive electrode plate and the negative electrode plate unable to accurately align. Therefore, the electrode plate prepared by using the composite current collector is prone to technical problems such as relatively great internal resistance and relatively great polarization. In the electrode plate in this application, the electrode active material layer includes the three zones classified by compacted density, and the compacted density of the middle zone is greater than the compacted density of the zones on two sides. Such special partition design can effectively suppress curvature and edge warpage of the composite current collector and the electrode plate caused by roll-in and the like. This ensures that the electrode plate maintains better flatness after roll-in, eliminates or reduces technical problems such as relatively great internal resistance and relatively great polarization of the electrode plate, and helps protect the conductive layer from damage, thereby ensuring good electrochemical performance of the electrode plate and the electrochemical device.

Therefore, the electrode plate in this application has high energy density, good electrochemical performance, good processing performance, and good safety performance, and an electrode plate and an electrochemical device (for example, a lithium-ion battery) with excellent comprehensive performance can be provided.

In addition, due to a relatively thin conductive layer of this composite current collector, compared with the conventional metal current collector (Al foil or Cu foil), the composite current collector has poorer conductivity, and the conductive layer is prone to damage in the electrode plate processing process, further affecting the electrochemical performance of the electrochemical device. In the electrode plate in some embodiments of this application, a conductive primer layer including a conductive material and a binder is also additionally disposed between the current collector and the electrode active material layer. Specifically, the conductive primer layer is disposed between the conductive layer of the current collector and the electrode active material layer. Therefore, the conductive primer layer can improve the interface between the composite current collector and the electrode active material layer, further increase the binding force between the current collector and the electrode active material layer, and ensure that the electrode active material layer is more firmly disposed on the surface of the composite current collector. In addition, the conductive primer layer can overcome shortcomings such as poor conductivity of the composite current collector and damage vulnerability of the conductive layer in the composite current collector. By effectively mending and constructing a conductive network among the current collector, the conductive primer layer, and the active material, the conductive primer layer improves the electron transfer efficiency, and reduces the resistance of the electrode plate including the composite current collector. In this way, the internal direct current resistance (DCR) in the electrode assembly can be effectively reduced, the power performance of the electrode assembly is improved, and it is ensured that the electrode assembly is not prone to phenomena such as relatively large polarization and lithium precipitation during long-term cycling. That is, the long-term reliability of the electrode assembly is effectively improved.

The following describes in detail a structure, a material, performance, and the like of the electrode plate (and the current collector in the electrode plate) in the embodiments of this application.

[Conductive Layer of the Current Collector]

Compared with a conventional metal current collector, in the current collector in an embodiment of this application, the conductive layer has a conductive function and a current collection function, and is configured to provide electrons for the electrode active material layer.

The material of the conductive layer is selected from at least one of a metal conductive material or a carbon-based conductive material.

The metal conductive material is preferably selected from at least one of aluminum, copper, nickel, titanium, silver, nickel-copper alloy, or aluminum-zirconium alloy.

The carbon-based conductive material is preferably selected from at least one of graphite, acetylene black, graphene, or a carbon nanotube.

The material of the conductive layer is preferably made of a metal conductive material, that is, the conductive layer is preferably a metal conductive layer. When the current collector is a positive electrode current collector, aluminum is usually used as the material of the conductive layer; and when the current collector is a negative electrode current collector, copper is usually used as the material of the conductive layer.

When the conductive layer has poor conductivity or a too small thickness, the internal resistance and polarization of the battery are large; and when the conductive layer is too thick, an effect of improving mass energy density and volumetric energy density of the battery cannot be achieved.

The single-sided thickness of the conductive layer is D2. D2 preferably satisfies 30 nm≤D2≤3 μm, more preferably, 300 nm≤D2≤2 μm, and most preferably, 500 nm≤D2≤1.5 μm, to better ensure light weight and good conductivity of the current collector.

In a preferred embodiment of this application, an upper limit of the single-sided thickness D2 of the conductive layer may be 3 μm, 2.5 μm, 2 μm, 1.8 μm, 1.5 μm, 1.2 μm, 1 μm, and 900 nm, and a lower limit of the single-sided thickness D2 of the conductive layer may be 800 nm, 700 nm, 600 nm, 500 nm, 450 nm, 400 nm, 350 nm, 300 nm, 100 nm, 50 nm, and 30 nm. A range of the single-sided thickness D2 of the conductive layer may be defined by any one of the lower limit values and any one of the upper limit values. Preferably, 300 nm≤D2≤2 μm; and more preferably, 500 nm≤D2≤1.5 μm.

Because the thickness of the conductive layer in this application is relatively small, damages such as cracks are prone to occur in processes such as manufacturing of the electrode plate. Generally, cracks exist in the conductive layer of the electrode plate in this application. The cracks in the conductive layer usually exist irregularly in the conductive layer. The cracks may be elongated cracks, cross-shaped cracks, divergent cracks, and the like, or the cracks may be cracks that penetrate the entire conductive layer, or may be formed on the surface of the conductive layer. The cracks in the conductive layer are usually caused by roll-in during the electrode plate processing, excessive amplitude during tab welding, and excessive reeling tension of a substrate.

The conductive layer may be formed on the support layer through at least one of mechanical roll-in, bonding, vapor deposition (vapor deposition), or electroless plating (Electroless plating). The vapor deposition method is preferably physical vapor deposition (Physical Vapor Deposition, PVD). The physical vapor deposition method is preferably at least one of an evaporating method or a sputtering method. The evaporating method is preferably at least one of vacuum evaporating (vacuum evaporating), thermal evaporation deposition (Thermal Evaporation Deposition), or electron beam evaporation method (electron beam evaporation method, EBEM). The sputtering method is preferably magnetron sputtering (Magnetron sputtering).

Preferably, at least one of vapor deposition or electroless plating is used, so that the support layer and the conductive layer are more tightly bonded.

[Support Layer of the Current Collector]

In the current collector in an embodiment of this application, the support layer has functions of supporting and protecting the conductive layer. Since the support layer generally uses an organic polymer material, density of the support layer is usually lower than density of the conductive layer, which can significantly increase the mass energy density of the battery compared to a conventional metal current collector.

In addition, the metal layer having a smaller thickness is used, which can further increase the mass energy density of the battery. In addition, because the support layer can well support and protect the conductive layer on a surface of the support layer, a common fracture phenomenon of an electrode plate in the conventional current collector is not prone to occur.

The material of the support layer is selected from at least one of an insulation polymer material, an insulation polymer composite material, a conductive polymer material, or a conductive polymer composite material.

The insulation polymer material is, for example, selected from at least one of polyamide, polyterephthalate, polyimide, polyethylene, polypropylene, polystyrene, polyvinyl chloride, aramid, polydiformylphenylenediamine, acrylonitrile-butadiene-styrene copolymer, polybutylene terephthalate, poly(p-phenylene terephthalamide), ethylene propylene rubber, polyoxymethylene, epoxy resin, phenolic resin, polytetrafluoroethylene, polyphenyl sulfide, polyvinylidene fluoride, silicone rubber, polycarbonate, cellulose and its derivatives, starch and its derivatives, protein and its derivatives, polyvinyl alcohol and its cross-linked products, or polyethylene glycol and its cross-linked products.

The insulation polymer composite material is, for example, selected from a composite material formed of an insulation polymer material and an inorganic material, where the inorganic material is preferably at least one of a ceramic material, a glass material, or a ceramic composite material.

The conductive polymer material is, for example, selected from a polysulfur nitride polymer material or a doped conjugated polymer material, such as at least one of polypyrrole, polyacetylene, polyaniline, or polythiophene.

The conductive polymer composite material is, for example, selected from a composite material formed of an insulation polymer material and a conductive material, where the conductive material is selected from at least one of a conductive carbon material, a metal material, or a composite conductive material, the conductive carbon material is selected from at least one of carbon black, carbon nanotube, graphite, acetylene black, or graphene, the metal material is selected from at least one of nickel, iron, copper, aluminum, or alloy of the foregoing metals, and the composite conductive material is selected from at least one of nickel-coated graphite powder or nickel-coated carbon fiber.

A person skilled in the art can appropriately select and determine the material of the support layer based on an actual need of the application environment, costs and other factors. In this application, the material of the support layer is preferably an insulation polymer material or an insulation polymer composite material, especially when the current collector is a positive electrode current collector.

When the current collector is a positive electrode current collector, the safety performance of the battery can be significantly improved by using a special current collector, which has a conductive layer having a specific thickness and supported by an insulation layer. Because the insulation layer is non-conductive, its resistance is relatively large, which can increase the short-circuit resistance when the battery is short-circuited in an abnormal case, and greatly reduce the short-circuit current. Therefore, heat generated by the short circuit can be greatly reduced, thereby improving the safety performance of the battery. In addition, the conductive layer is relatively thin, so that in an abnormal case such as nail penetration, a local conductive network is cut off, preventing a large area of the electrochemical device or even the entire electrochemical device from being short-circuited. This can limit the damage to the electrochemical device caused by nail penetration to a penetrated site, only causing a "point break" without affecting the normal operation of the electrochemical device within a period of time.

The thickness of the support layer is D1, and D1 preferably satisfies 1 µm≤D1≤30 µm, and more preferably, 1 µm≤D1≤15 µm.

If the support layer is too thin, the mechanical strength of the support layer is insufficient, and breakage may easily occur during processes such as electrode plate processing. If the support layer is too thick, the volumetric energy density of a battery using the current collector is reduced.

The upper limit of the thickness D1 of the support layer may be 30 µm, 25 µm, 20 µm, 15 µm, 12 µm, 10 µm, and 8 µm, and a lower limit may be 1 µm, 1.5 µm, 2 µm, 3 µm, 4 µm, 5 µm, 6 µm, and 7 µm; and a range of the thickness D1 of the support layer may be defined by any one of the lower limit values and any one of the upper limit values. Preferably, 1 µm≤D1≤15 µm, more preferably, 2 µm≤D1≤10 µm, and most preferably, 3≤D1≤8 µm.

In addition, the conductive layer of the specified thickness in this application can further ensure that the current collector has great resistance, and significantly reduce temperature rise of the battery when a short circuit occurs in the battery. When the conductive layer is made of aluminum, this can further significantly reduce or prevent a thermit reaction of the positive electrode current collector, and ensure good safety performance of the battery.

In addition, when the conductive layer is a metal conductive layer, a room-temperature Young's modulus of the support layer preferably satisfies 20 GPa≥E≥4 GPa.

In this application, the method for testing the room-temperature Young's modulus of the support layer is as follows:

A support layer sample is taken and cut into a size of 15 mm×200 mm. Thickness h (µm) of the sample is measured with a ten-thousandth micrometer. A Gotech tensile machine is used under room temperature and pressure to carry out a tensile test. An initial position is set, and the sample is retained 50 mm in length between clamps. Stretching is carried out at a speed of 50 mm/min. Load L (N) and displacement y (mm) of the equipment are recorded when the sample is stretched to break. In this case, stress $\varepsilon$=L/(15×h)×1000, and strain $\eta$=y/50×100. A stress-strain curve is drawn, and a curve in an initial linear zone is taken, where a slope of this curve is the Young's modulus E.

Since metal is more rigid than polymer or polymer composite materials, that is, the deformation is smaller during the roll-in process of the electrode plate processing, in order to ensure that a deformation difference between the support layer and the conductive layer is not too large to tear the conductive layer, the room-temperature Young's modulus of the support layer should preferably satisfy: 20 GPa≥E≥4 GPa, so that the support layer can have a rigidity, and the rigidity matching between the support layer and the conductive layer can be further improved. This ensures that the difference in the deformations of the support layer and the conductive layer will not be too large during the processing of the current collector and the electrode plate.

Since the support layer has a rigidity (20 GPa≥E≥4 GPa), the current collector is not easy to deform or stretch too much during the processing of the current collector and the electrode plate, so that the support layer and the conductive layer are firmly bonded and not easily separated, so as to prevent damage to the conductive layer caused by the conductive layer being "forced" to stretch. In addition, the current collector in this application has some tenacity, thereby ensuring that the current collector and the electrode plate have some capabilities to withstand deformation and are not prone to strip breakage.

However, the Young's modulus of the support layer cannot be too large; otherwise, too strong rigidity causes reeling and winding difficulties and poor workability. When 20 GPa≥E, the support layer can be guaranteed to have some flexibility, and the electrode plates can also have an ability to withstand deformation.

In addition, a thermal shrinkage of the support layer at 90° C. is preferably not more than 1.5%, to better ensure the thermal stability of the current collector during the processing of the electrode plate.

[Protective Layer of the Current Collector]

In some embodiments of this application, the current collector is further provided with a protective layer. The protective layer is disposed on one surface of the conductive layer of the current collector or disposed on two surfaces of the conductive layer of the current collector, that is, a surface of the conductive layer farther away from the support layer and a surface facing toward the support layer.

The protective layer may be a metal protective layer or a metal oxide protective layer. The protective layer can prevent the conductive layer of the current collector from being damaged by chemical corrosion or mechanical damage, and can also enhance the mechanical strength of the current collector.

Preferably, the protective layer is disposed on two surfaces of the conductive layer of the current collector. A lower protective layer of the conductive layer (that is, the protective layer disposed on the surface of the conductive layer facing toward the support layer) can not only prevent damage to the conductive layer and enhance the mechanical strength of the current collector, but also enhance the binding force between the support layer and the conductive layer to prevent peeling (that is, the separation of the support layer from the conductive layer).

The technical effect of an upper protective layer of the conductive layer (that is, the protective layer disposed on the surface of the conductive layer farther away from the support layer) is mainly to prevent the conductive layer from being damaged, corroded, and the like during processing (for example, both electrolyte infiltration and roll-in affect the surfaces of the conductive layer). In the electrode plate of this application, a conductive primer layer is used to mend the cracks that may occur in the conductive layer during the processes such as roll-in and winding, enhance the conductivity, and make up for the deficiency of the composite current collector as a current collector. Therefore, the upper protective layer of the conductive layer can cooperate with the conductive primer layer to further provide protection for the conductive layer, thereby jointly improving the conductive effect of the composite current collector used as the current collector.

In virtue of the good conductivity, the metal protective layer can not only further improve the mechanical strength and corrosion resistance of the conductive layer, but also reduce the polarization of the electrode plate. The material of the metal protective layer is, for example, selected from at least one of nickel, chromium, a nickel-based alloy, or a copper-based alloy, and preferably, nickel or a nickel-based alloy.

The nickel-based alloy is an alloy formed by adding one or more other elements to pure nickel as the matrix. Preferably, it is a nickel-chromium alloy. The nickel-chromium alloy is an alloy formed of metallic nickel and metallic chromium. Optionally, the molar ratio of nickel to chromium is 1:99 to 99:1.

The cooper-based alloy is an alloy formed by adding one or more other elements to a pure cooper matrix. Preferably, it is a copper-nickel alloy. Optionally, in the copper-nickel alloy, a molar ratio of nickel to copper is 1:99 to 99:1.

When a metal oxide is selected for the protective layer, due to its low ductility, large specific surface area, and high hardness, it can also effectively support and protect the conductive layer, and have a good technical effect on improving the binding force between the support layer and the conductive layer. The material of the metal oxide protective layer is, for example, selected from at least one of aluminum oxide, cobalt oxide, chromium oxide, or nickel oxide.

When used as a positive electrode current collector, the composite current collector according to this application preferably uses metal oxide as its protective layer to further improve safety performance of the positive electrode plate and battery while achieving a good technical effect of support and protection. When used as a negative electrode current collector, the composite current collector according to this application preferably uses metal as its protective layer to further improve conductivity of the electrode plate and kinetic performance of the battery to further reduce polarization of the battery, while achieving a good technical effect of support and protection.

The thickness of the protective layer is D3, and D3 preferably satisfies D3≤⅒D2, and 1 nm≤D3≤200 nm. If the protective layer is too thin, it is not enough to protect the conductive layer; and if the protective layer is too thick, the mass energy density and the volumetric energy density of the battery are reduced. More preferably, 5 nm≤D3≤500 nm, even more preferably, 10 nm≤D3≤200 nm, and most preferably, 10 nm≤D3≤50 nm.

The materials of the protective layers on the two surfaces of the conductive layer may be the same or different, and the thicknesses of the protective layers may be the same or different.

Preferably, the thickness of the lower protective layer is less than the thickness of the upper protective layer to help improve the mass energy density of the battery.

Further optionally, the ratio of the thickness D3" of the lower protective layer to the thickness D3' of the upper protective layer is: ½ D3'≤D3"≤⅘ DY.

When the current collector is a positive electrode current collector, aluminum is usually used as the material of the conductive layer, and a metal oxide material is preferably selected for the lower protective layer. Compared with the choice of metal used for the lower protective layer, the metal oxide material has larger resistance. Therefore, this type of lower protective layer can further increase the resistance of the positive electrode current collector to some extent, thereby further increasing the short circuit resistance of the battery in the event of a short circuit in an abnormal case, and improving the safety performance of the battery. In addition, because the specific surface area of the metal oxide is larger, the binding force between the lower protective layer of the metal oxide material and the support layer is enhanced. Moreover, because the specific surface area of the metal oxide is larger, the lower protective layer can increase the roughness of the support layer surface, and enhance the binding force between the conductive layer and the support layer, thereby increasing the overall strength of the current collector.

When the current collector is a negative electrode current collector, copper is usually used as the material of the conductive layer, and a metal material is preferably selected for the protective layer. More preferably, on the basis of including at least one metal protective layer, at least one of the lower protective layer or the lower protective layer further includes a metal oxide protective layer, to simultaneously improve the conductivity and interface binding force of the negative electrode composite current collector.

[Current Collector]

FIG. 1 to FIG. 8 show schematic structural diagrams of current collectors used in electrode plates according to some embodiments of this application.

Schematic diagrams of a positive electrode current collector are shown in FIG. 1 to FIG. 4.

In FIG. 1, a positive electrode current collector 10 includes a positive electrode current collector support layer 101 and positive electrode current collector conductive layers 102 that are disposed on two opposite surfaces of the positive electrode current collector support layer 101, and further includes positive electrode current collector protective layers 103 that are disposed on lower surfaces of the positive electrode current collector conductive layers 102 (that is, surfaces facing toward the positive electrode current collector support layer 101), that is, lower protective layers.

Figure 2:
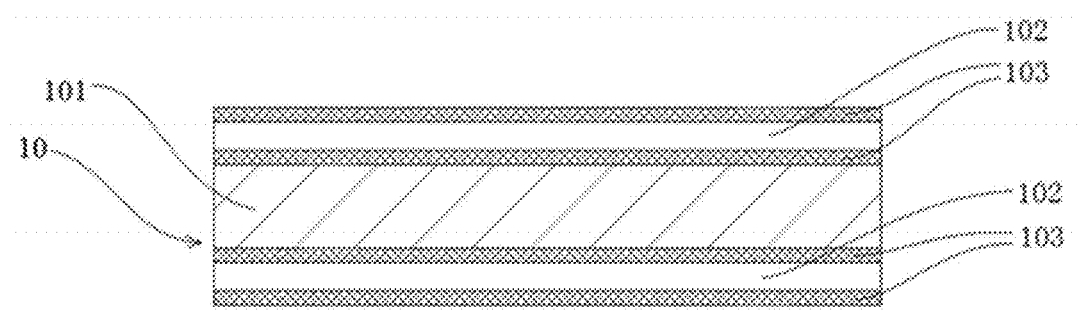
FIG. 2 is a schematic structural cross-sectional view of a positive electrode current collector according to another embodiment of this application.

In FIG. 2, a positive electrode current collector 10 includes a positive electrode current collector support layer 101 and positive electrode current collector conductive layers 102 that are disposed on two opposite surfaces of the positive electrode current collector support layer 101, and further includes positive electrode current collector protective layers 103 that are disposed on two opposite surfaces of the positive electrode current collector conductive layer 102, that is, a lower protective layer and an upper protective layer.

Figure 3:
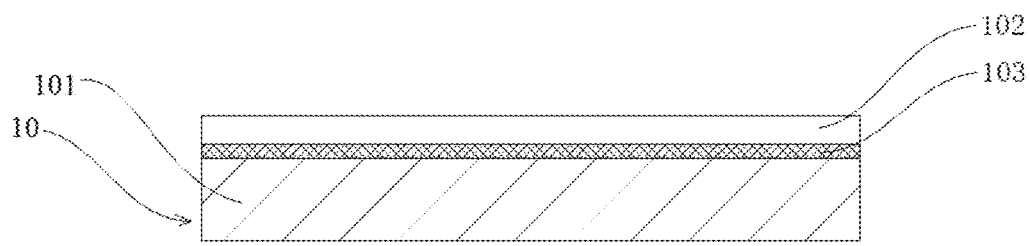
FIG. 3 is a schematic structural cross-sectional view of a positive electrode current collector according to another embodiment of this application.

In FIG. 3, a positive electrode current collector 10 includes a positive electrode current collector support layer 101 and a positive electrode current collector conductive layer 102 that is disposed on one surface of the positive electrode current collector support layer 101, and further includes a positive electrode current collector protective layer 103 that is disposed on a surface of the positive electrode current collector conductive layer 102 facing toward the positive electrode current collector support layer 101, that is, a lower protective layer.

Figure 4:
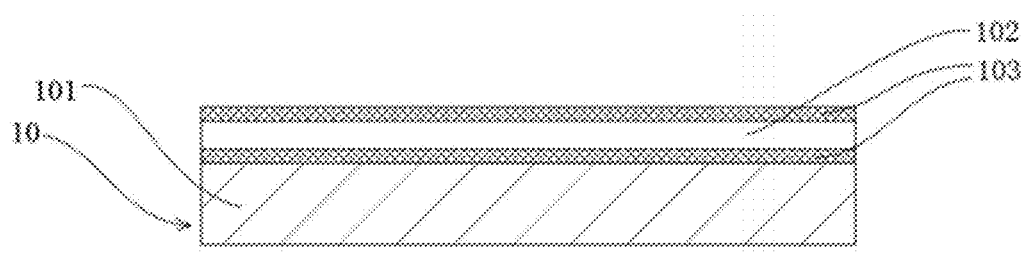
FIG. 4 is a schematic structural cross-sectional view of a positive electrode current collector according to another embodiment of this application.

In FIG. 4, a positive electrode current collector 10 includes a positive electrode current collector support layer 101 and a positive electrode current collector conductive layer 102 that is disposed on one surface of the positive electrode current collector support layer 101, and further includes positive electrode current collector protective layers 103 that are disposed on two opposite surfaces of the positive electrode current collector conductive layer 102, that is, a lower protective layer and an upper protective layer.

Similarly, the schematic diagrams of a negative electrode current collector are shown in FIG. 5 to FIG. 8.

Figure 5:
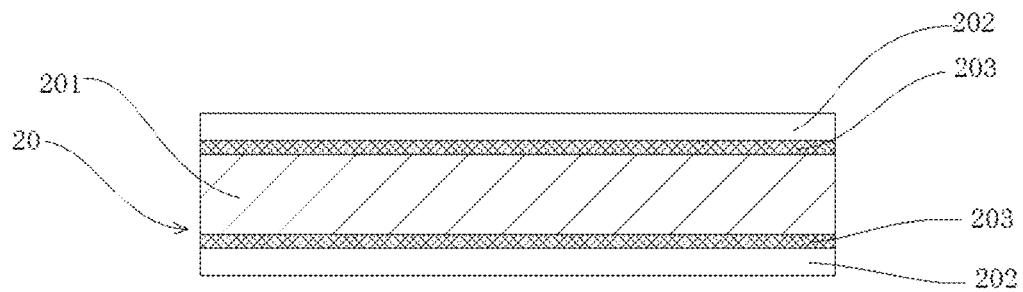
FIG. 5 is a schematic structural cross-sectional view of a negative electrode current collector according to an embodiment of this application.

In FIG. 5, a negative electrode current collector 20 includes a negative electrode current collector support layer 201 and negative electrode current collector conductive layers 202 disposed on two opposite surfaces of the negative electrode current collector support layer 201, and further includes negative electrode current collector protective layers 203 disposed on surfaces of the negative electrode current collector conductive layers 202 facing toward the negative electrode current collector support layer 201, that is, lower protective layers.

Figure 6:
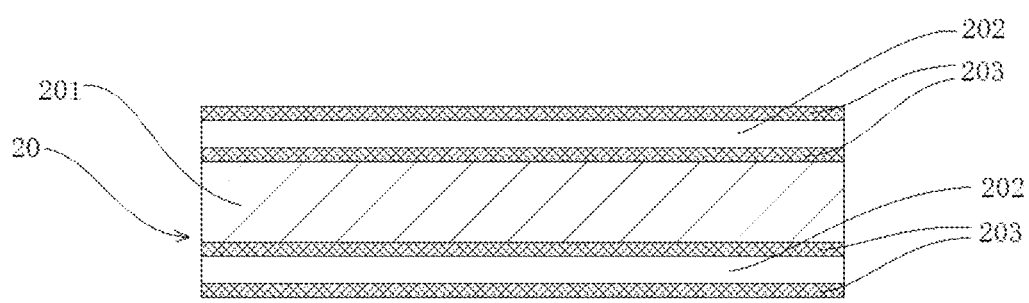
FIG. 6 is a schematic structural cross-sectional view of a negative electrode current collector according to another embodiment of this application.

In FIG. 6, a negative electrode current collector 20 includes a negative electrode current collector support layer 201 and negative electrode current collector conductive layers 202 disposed on two opposite surfaces of the negative electrode current collector support layer 201, and further includes negative electrode current collector protective layers 203 disposed on two opposite surfaces of the negative electrode current collector conductive layer 202, that is, a lower protective layer and an upper protective layer.

Figure 7:
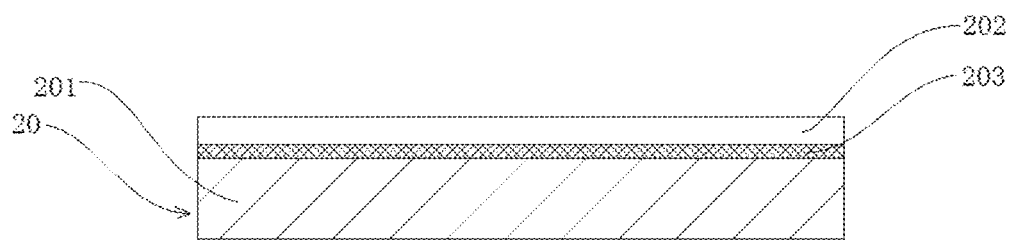
FIG. 7 is a schematic structural cross-sectional view of a negative electrode current collector according to another embodiment of this application.

In FIG. 7, a negative electrode current collector 20 includes a negative electrode current collector support layer 201 and a negative electrode current collector conductive layer 202 disposed on one surface of the negative electrode current collector support layer 201, and further includes a protective layer 203 of the negative electrode current collector disposed on the negative electrode current collector conductive layer 202 facing toward the negative electrode current collector support layer 201, that is, a lower protective layer.

Figure 8:
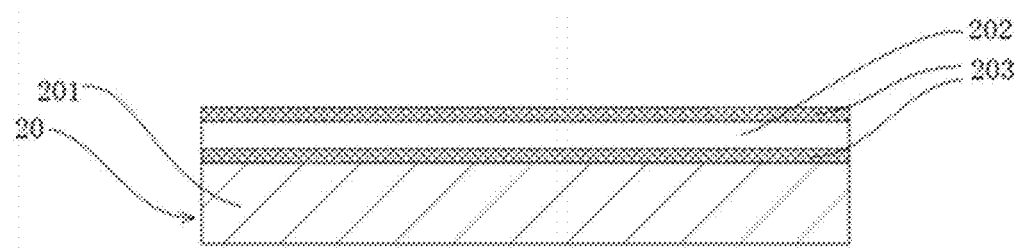
FIG. 8 is a schematic structural cross-sectional view of a negative electrode current collector according to another embodiment of this application.

In FIG. 8, a negative electrode current collector 20 includes a negative electrode current collector support layer 201 and a negative electrode current collector conductive layer 202 disposed on one surface of the negative electrode current collector support layer 201, and further includes negative electrode current collector protective layers 203 disposed on two opposite surfaces of the negative electrode current collector conductive layer 202, that is, a lower protective layer and an upper protective layer.

The materials of the protective layers on the two opposite surfaces of the conductive layer may be the same or different, and the thicknesses of the protective layers may be the same or different.

For the current collectors used for the electrode plate according to this application, a conductive layer may be separately disposed on two opposite surfaces of the support layer, as shown in FIG. 1, FIG. 2, FIG. 5, and FIG. 6; or a conductive layer may be disposed on only one surface of the support layer, as shown in FIG. 3, FIG. 4, FIG. 7, and FIG. 8.

In addition, although the composite current collector used for the electrode plate in this application preferably includes the protective layer of the current collector shown in FIG. 1 to FIG. 8, it should be understood that the protective layer of the current collector is not a necessary structure of the current collector. In some embodiments, the used current collector may not include the protective layer of the current collector.

[Electrode Active Material Layer of an Electrode Plate]

The electrode active material layer used for the electrode plate in this application generally includes an electrode active material, a binder, and a conductive agent. The electrode active material layer may further include other optional additives or auxiliaries as needed.

For the positive electrode plate, various electrode active materials commonly used in the art (that is, positive electrode active materials) may be selected. For example, for lithium batteries, the positive electrode active material may be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, lithium iron phosphate, and the like. However, this application is not limited to these materials, and may further use other conventional well-known materials that can be used as positive electrode active materials of the lithium-ion battery. One type of these positive electrode active materials may be used alone, or two or more types may be used in combination. Preferably, the positive electrode active material may be selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$, and $LiMnPO_4$.

For the negative electrode plate, various electrode active materials commonly used in the art (that is, negative electrode active materials) may be selected. For example, for the lithium battery, a negative electrode active material may be selected from carbon materials such as graphite (artificial graphite or natural graphite), conductive carbon black, and carbon fiber, metal or semi-metal materials such as Si, Sn, Ge, Bi, Sn, and In, and their alloys, lithium-containing nitrides or lithium-containing oxides, lithium metal or lithium aluminum alloys, and the like.

For the electrode plate in this application, an average particle size D50 of the active material in the electrode active material layer is preferably 5 μm to 15 μm. If D50 is excessively small, porosity of the electrode plate after compaction is relatively small, which is not conducive to the infiltration of the electrolyte, and its relatively large specific surface area is likely to cause more side reactions with the electrolyte, reducing the reliability of the electrode assembly; or if D50 is excessively large, great damage is likely to be caused to the conductive primer layer and the composite current collector during the compaction process of the electrode plate. D50 is the corresponding particle size when a cumulative volume percentage of the active material reaches 50%, that is, a median particle size in volume distribution. For example, D50 may be measured by using a laser diffraction particle size distribution measuring instrument (for example, Malvern Mastersizer 3000).

The conductive agent in the electrode active material layer may be at least one of a conductive carbon material or a metal material. The conductive carbon material is selected from at least one of zero-dimensional conductive carbon such as acetylene black or conductive carbon black, one-dimensional conductive carbon such as carbon nanotube, two-dimensional conductive carbon such as conductive graphite or graphene, or three-dimensional conductive carbon such as reduced graphene oxide, and the metal material is selected from at least one of aluminum powder, iron powder, or silver powder.

The binder in the electrode active material layer may be selected from at least one of styrene butadiene rubber, oily polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic-acid-polyacrylonitrile copolymer, or polyacrylate-polyacrylonitrile copolymer.

It is known to a person skilled in the art, the needed electrode active material layer is obtained by applying slurry formed of the electrode active material, the conductive agent, and the binder onto the electrode current collector (or onto the primer layer of the electrode current collector in advance), and then performing post-processing such as drying. However, the formation method and compositions of the electrode active material layer of the electrode plate in this application are different from those of a conventional electrode plate.

A conventional electrode plate can be coated with one or more electrode active material layers, but in either case, the electrode active material layer is uniformly applied in a coating zone on a surface of the entire electrode plate, and a cold pressing (roll-in) operation is also performed on the surface of the entire electrode plate. Therefore, the resulting electrode active material layer on the electrode plate has basically the same compacted density with no significant difference.

As an important feature of the electrode plate in this application, when viewed in a width direction of the coated surface of the electrode plate, the electrode active material layer includes three zones classified by compacted density, and compacted density of the middle zone is greater than compacted density of zones on both sides. Because compacted density of the zones on both sides of the electrode plate is low after the process such as the cold pressing (roll-in), and compacted density of the middle zone is high, that is, pressure on the zones on the both sides of the electrode plate is lower than that on the middle zone in the process such as the cold pressing (roll-in), edge warpage and curvature of the composite current collector and the electrode plate that are caused by the rebound of the composite current collector during the electrode plate processing may be prevented, which is conducive to formation of the electrode plate with a flat surface, thereby helping to ensure electrochemical performance of the electrochemical device.

In this application, the "length direction" and "width direction" of the surface of the electrode plate respectively refer to two dimensions of the surface. The length direction is a main dimension direction (that is, a direction with a larger magnitude), and the width direction is a secondary dimension direction (that is, a direction with a smaller magnitude). Generally, the length direction is consistent with a coating direction of each material layer (for example, the electrode active material layer) during the electrode plate processing, and is also consistent with a winding direction of the electrode plate during a manufacturing process of the electrochemical device (for example, the battery); and the width direction is perpendicular to the length direction.

To form the three zones of the active material layer based on the compacted density according to this application, a partition coating method may be used. That is, the surface of the electrode plate is separated into different zones (or boundaries) by using baffle plates or spacers. Each zone is applied with an electrode active material slurry of a different weight. In this way, after roll-in, zones of the active material layer that have different compacted density are formed. In addition, zones on both sides preferably have identical compacted density. Such design helps to better ensure flatness of the electrode plate.

In a case in which the electrode active material layer includes three zones based on the compacted density, another important feature of the electrode plate in this application is that based on a total weight of the electrode active material layer, the binder content of the electrode active material layer is preferably not less than 1 wt %, more preferably, not less than 1.5 wt %, and most preferably, not less than 2 wt %. For the electrode plate in this application, when the binder content of the electrode active material layer is relatively high, binding force between the active material layer and the composite current collector can be strengthened, to suppress deterioration of the binding force between the composite current collector and the electrode active material layer that is caused by relatively great rebound of the support layer during processing, thereby ensuring that the electrode active material layer is not prone to be separated from the composite current collector. If the binding force between the composite current collector and the electrode active material layer is insufficient, internal resistance of the battery is relatively great, polarization is increased, and electrochemical performance is relatively poor. When the binding force is relatively strong, in an abnormal case such as nail penetration, the active material layer can efficiently wrap metal fins generated in the conductive layer, to improve nail penetration safety performance of the battery. When the binder content is maintained within such range, the binding force between the active material layer and the current collector is relatively strong, and as a result, in an abnormal case such as nail penetration, the active material layer can more efficiently wrap the metal fins generated in the conductive layer to improve the nail penetration safety performance of the battery.

[Conductive Primer Layer of an Electrode Plate]

In some embodiments of this application, a conductive primer layer including the conductive material and a binder is also additionally disposed between the current collector and the electrode active material layer. Specifically, the conductive primer layer is disposed between the conductive layer of the current collector and the electrode active material layer. The conductive primer layer includes the conductive material and a binder, and preferably, the conductive primer layer further includes an electrode active material.

Based on a total weight of the conductive primer layer, a weight percentage of a conductive material is 10% to 99%, preferably, 20% to 80%, and more preferably, 50% to 80%; and a weight percentage of the binder is 1% to 90%, preferably, 20% to 80%, and more preferably, 20% to 50%. The percentage can help to improve the conductivity of the electrode plate and the binding force between the current collector and the electrode active material layer.

Preferably, the conductive primer layer may further include an electrode active material. When the electrode active material is included, electrochemical capacity of the positive electrode plate can be increased.

A margin other than the conductive material and the binder may be the electrode active material. In a preferred embodiment of this application, based on a total weight of the conductive primer layer, a percentage of the conductive agent is preferably 10 wt % to 98 wt %, a percentage of the binder is preferably 1 wt % to 89 wt %, and a percentage of the electrode (positive electrode) active material is preferably 1 wt % to 89 wt %.

The conductive material is at least one of a conductive carbon material or a metal material. The conductive material in the conductive primer layer and the conductive agent in the active material layer may be identical or different.

The conductive carbon material is selected from at least one of zero-dimensional conductive carbon (for example, acetylene black or conductive carbon black), one-dimensional conductive carbon (for example, carbon nanotube), two-dimensional conductive carbon (for example, conductive graphite or graphene), or three-dimensional conductive carbon (for example, reduced graphene oxide). The metal material is selected from at least one of aluminum powder, iron powder, or silver powder.

A preferred conductive material includes a one-dimensional conductive carbon material or a two-dimensional conductive carbon material. After the two-dimensional conductive carbon material is added, the two-dimensional conductive carbon material in the conductive primer layer can come into "horizontal sliding" during the compaction of the electrode plate, achieving a function of buffering, reducing the damage to the conductive layer of the current collector during the compaction, and reducing cracks. Preferably, a particle size D50 of the two-dimensional conductive carbon material is 0.01 μm to 0.1 μm. Preferably, the two-dimensional conductive carbon material accounts for 1 wt % to 50 wt % of the conductive material. In addition, due to the special morphology of the one-dimensional conductive carbon material, the conductivity of the conductive primer layer can be improved after addition. Especially when a specified amount of the conductive material is added, compared with other types of conductive materials, the one-dimensional conductive carbon material can better improve the conductivity of the conductive primer layer. Preferably, carbon nanotube is used, and a length-size ratio of the carbon nanotube is preferably 1000 to 5000.

Preferably, the conductive material is a mixed material of a zero-dimensional conductive carbon material and a one-dimensional conductive carbon material or a mixed material of a zero-dimensional conductive carbon material and a two-dimensional conductive carbon material.

The binder in the conductive primer layer and the binder in the active material layer may be identical or different.

The binder in the conductive primer layer is selected from at least one of styrene butadiene rubber, oily polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic-acid-polyacrylonitrile copolymer, or polyacrylate-polyacrylonitrile copolymer.

The binder in the conductive primer layer is preferably an aqueous binder, for example, at least one of aqueous PVDF, acrylic acid, polyurethane, polyvinyl alcohol, polyacrylate, polyacrylic-acid-polyacrylonitrile copolymer, or polyacrylate-polyacrylonitrile copolymer. In this way, DCR of the electrochemical device does not increase significantly. In this application, an "aqueous" polymer material means that the polymer molecular chain is fully extended and dispersed in water, and an "oily" polymer material means that the polymer molecular chain is fully extended and dispersed in an oily solvent. Those skilled in the art understand that the same type of polymer material can be dispersed in water and oily respectively by using suitable surfactants. That is, by using suitable surfactants, the same type of polymer material can be made into an aqueous polymer material and an oily polymer material. For example, a person skilled in the art can replace PVDF with aqueous PVDF or oily PVDF as needed.

The electrode active material in the conductive primer layer and the electrode active material in the active material layer may be identical or different. Various electrode active materials commonly used in the art may be selected as the electrode active material in the conductive primer layer.

The single-sided thickness H of the conductive primer layer is preferably: 0.1 μm to 5 μm. Preferably, H/D2 is 0.5:1 to 5:1. If the ratio is too small, the cracks of the conductive layer cannot be effectively reduced or the conductivity of the electrode plate cannot be effectively improved; or if the ratio is too large, not only the mass energy density of the battery is reduced, but also the DCR of the battery is increased, which is not conducive to improvement of the kinetic performance of the battery.

[Electrode Plate]

FIG. 9 to FIG. 16 are schematic structural cross-sectional views of electrode plates according to some embodiments of this application.

FIG. 9 to FIG. 12 are schematic diagrams of a positive electrode plate.

Figure 9:
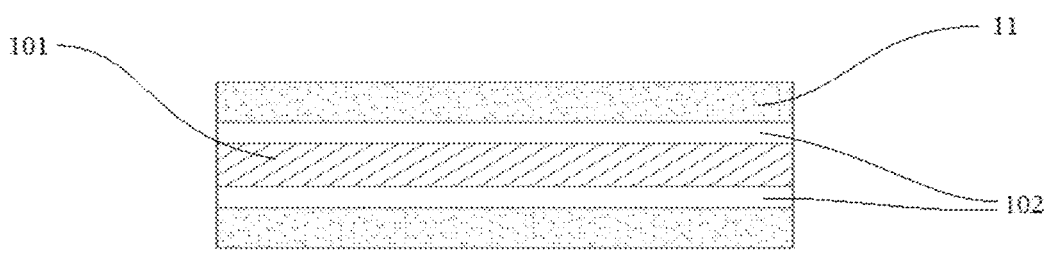
FIG. 9 is a schematic structural cross-sectional view of a positive electrode plate according to an embodiment of this application.

In FIG. 9, a positive electrode plate includes a positive electrode current collector 10 and positive electrode active material layers 11 that are disposed on two opposite surfaces of the positive electrode current collector 10. The positive electrode current collector 10 includes a positive electrode current collector support layer 101, positive electrode current collector conductive layers 102 that are disposed on two opposite surfaces of the positive electrode current collector support layer 101, and a positive electrode protective layer 103 (not shown in the figure) that is disposed on one side or two sides of the positive electrode conductive layer 102.

Figure 10:
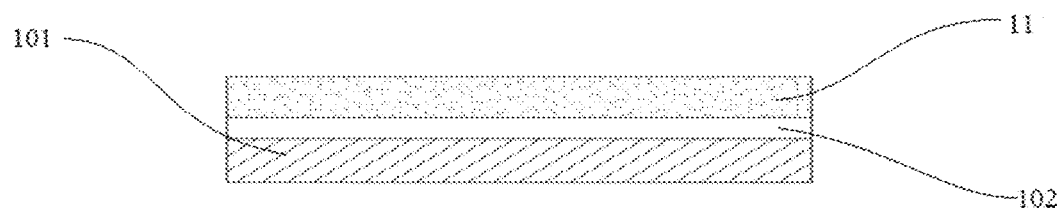
FIG. 10 is a schematic structural cross-sectional view of a positive electrode plate according to another embodiment of this application.

In FIG. 10, a positive electrode plate includes a positive electrode current collector 10 and a positive electrode active material layer 11 that is disposed on one surface of the positive electrode current collector 10. The positive electrode current collector 10 includes a positive electrode current collector support layer 101, a positive electrode current collector conductive layer 102 that is disposed on one surface of the positive electrode current collector support layer 101, and a positive electrode protective layer 103 (not shown in the figure) that is disposed on one side or two sides of the positive electrode conductive layer 102.

Figure 11:
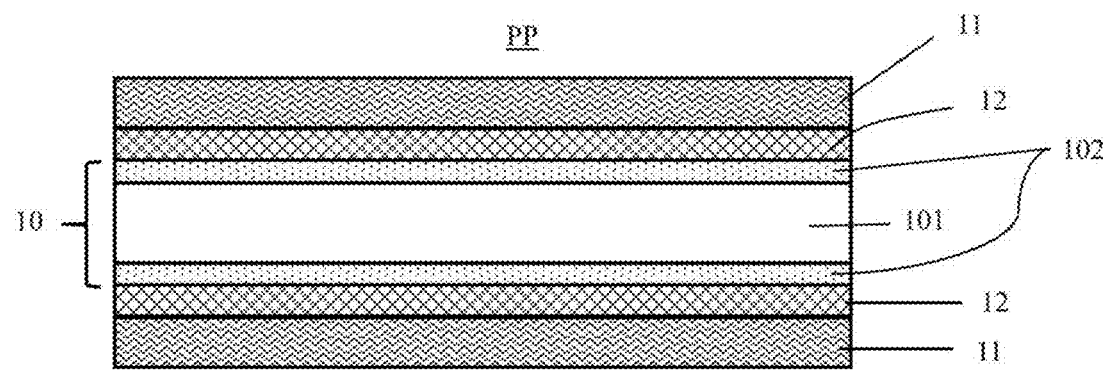
FIG. 11 is a schematic structural cross-sectional view of a positive electrode plate according to another embodiment of this application.

In FIG. 11, the positive electrode plate PP includes a positive electrode current collector 10, a conductive primer layer 12, and a positive electrode active material layer 11, where the conductive primer layer 12 and positive electrode active material layer 11 are disposed on two opposite surfaces of the positive electrode current collector 10 respectively. The positive electrode current collector 10 includes a positive electrode current collector support layer 101 and conductive layers of the positive electrode current collector 102 that are disposed on two opposite surfaces of the positive electrode current collector support layer 101.

Figure 12:
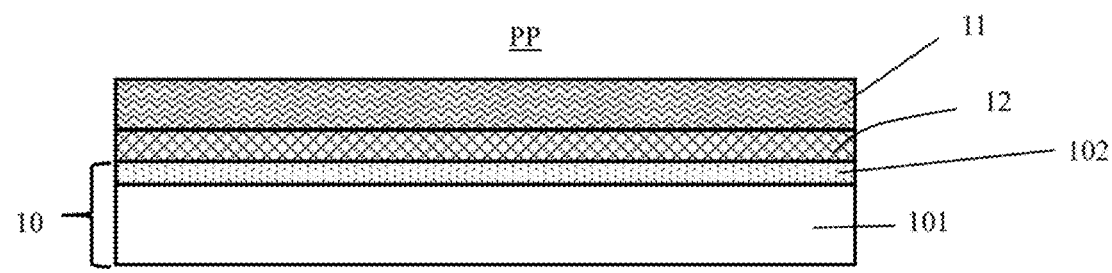
FIG. 12 is a schematic structural cross-sectional view of a positive electrode plate according to another embodiment of this application.

In FIG. 12, the positive electrode plate PP includes a positive electrode current collector 10, a conductive primer layer 12, and a positive electrode active material layer 11, where the conductive primer layer 12 and positive electrode active material layer 11 are disposed on one surface of the positive electrode current collector 10. The positive electrode current collector 10 includes a positive electrode current collector support layer 101 and a positive electrode current collector conductive layer 102 that is disposed on one surface of the positive electrode current collector support layer 101.

FIG. 13 to FIG. 16 are schematic diagrams of a negative electrode plate.

Figure 13:
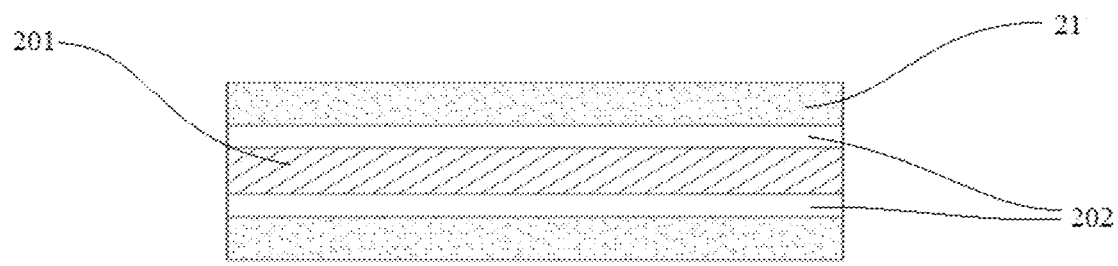
FIG. 13 is a schematic structural cross-sectional view of a negative electrode plate according to an embodiment of this application.

In FIG. 13, a negative electrode plate includes a negative electrode current collector 20 and negative electrode active material layers 21 that are disposed on two opposite surfaces of the negative electrode current collector 20. The negative electrode current collector 20 includes a negative electrode current collector support layer 201, negative electrode current collector conductive layers 202 that are disposed on two opposite surfaces of the negative electrode current collector support layer 201, and a negative electrode protective layer 203 (not shown in the figure) that is disposed on one side or two sides of the negative electrode conductive layer 202.

Figure 14:
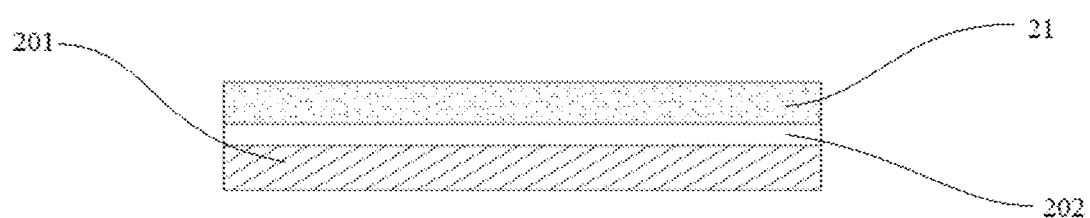
FIG. 14 is a schematic structural cross-sectional view of a negative electrode plate according to another embodiment of this application.

In FIG. 14, a negative electrode plate includes a negative electrode current collector 20 and a negative electrode active material layer 21 that is disposed on one surface of the negative electrode current collector 20. The negative electrode current collector 20 includes a negative electrode current collector support layer 201, a negative electrode current collector conductive layer 202 that is disposed on one surface of the negative electrode current collector support layer 201, and a negative electrode protective layer 203 (not shown in the figure) that is disposed on one side or two sides of the negative electrode conductive layer 202.

Figure 15:
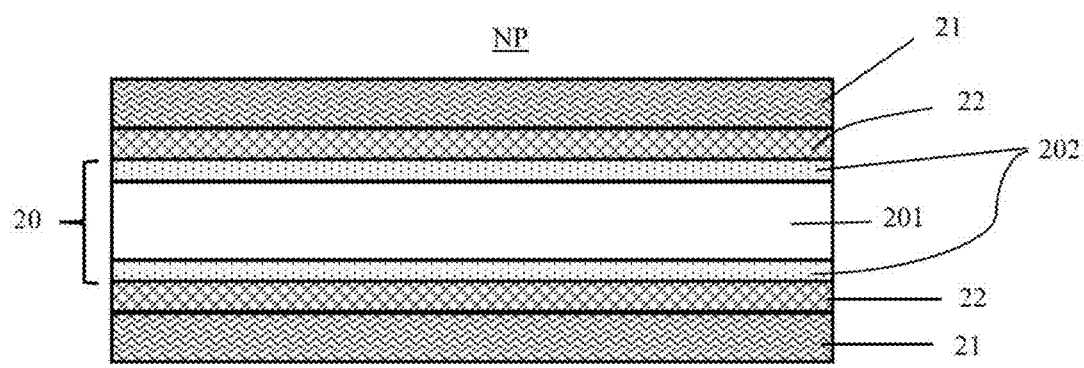
FIG. 15 is a schematic structural cross-sectional view of a negative electrode plate according to another embodiment of this application.

In FIG. 15, the negative electrode plate NP includes a negative electrode current collector 20, a conductive primer layer 22, and a negative electrode active material layer 21, where the conductive primer layer 22 and negative electrode active material layer 21 are disposed on two opposite surfaces of the negative electrode current collector 20 respectively. The negative electrode current collector 20 includes a negative electrode current collector support layer 201 and negative electrode current collector conductive layers 202 that are disposed on two opposite surfaces of the negative electrode current collector support layer 201.

Figure 16:
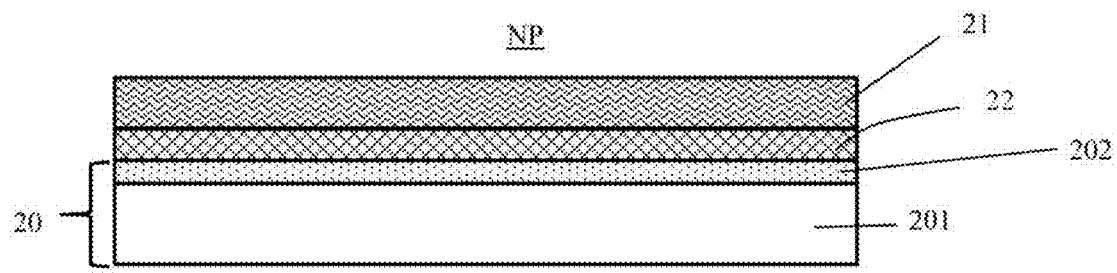
FIG. 16 is a schematic structural cross-sectional view of a negative electrode plate according to another embodiment of this application.

In FIG. 16, the negative electrode plate NP includes a negative electrode current collector 20, a conductive primer layer 22, and a negative electrode active material layer 21, where the conductive primer layer 22 and negative electrode active material layer 21 are disposed on one surface of the negative electrode current collector 20. The negative electrode current collector 20 includes a negative electrode current collector support layer 201 and a negative electrode current collector conductive layer 202 that is disposed on one surface of the negative electrode current collector support layer 201.

As shown in FIG. 9 to FIG. 16, the electrode active material layer may be disposed on only one surface of the current collector, or may be disposed on two surfaces of the current collector.

A person skilled in the art can understand that, when a current collector provided with double-sided conductive layers is used, the electrode plate may be obtained through double-sided coating (that is, electrode active material layers are disposed on the two surfaces of the current collector), or only single-sided coating (that is, the electrode active material layer is only disposed on one surface of the current collector); and when the current collector provided with only a single-sided conductive layer is used, the electrode plate may be obtained only through single-sided coating, and the electrode active material layer (and the conductive primer layer) may only be coated on one side of the current collector provided with the conductive layer.

Figure 17:
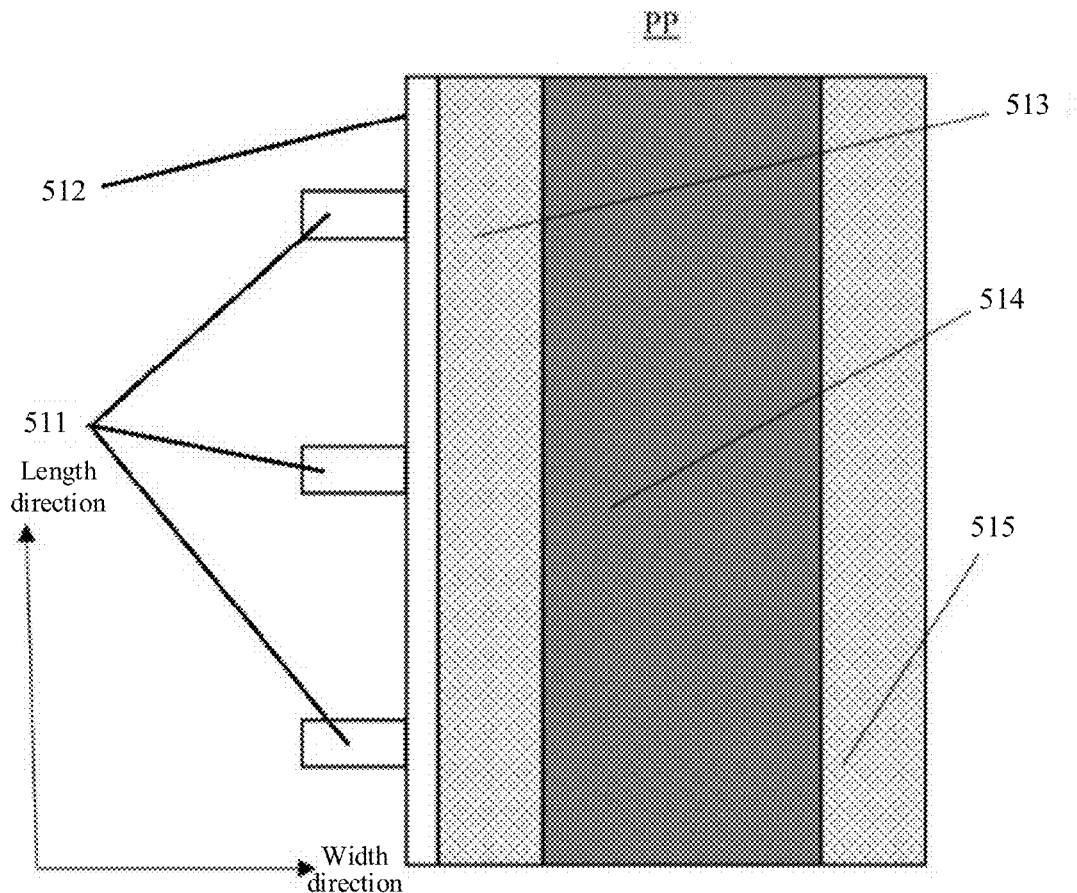
FIG. 17 is a schematic structural vertical view of a positive electrode plate according to an embodiment of this application.

FIG. 17 is a schematic structural vertical view of an electrode plate according to some embodiments of this application. The positive electrode plate PP includes a body of the electrode plate and one or more tabs 511 electrically connected to the body of the electrode plate. Based on different electrode active material layers for coating, the body of the electrode plate includes four zones: a clear zone 512 directly connected to the tab 511 (that is, a zone that is on the surface of the current collector and that is not coated with the active material layer), a first low compacted zone 513, a high compacted zone 514, and a second low compacted zone 515.

A person skilled in the art understands that the clear zone on the electrode plate is disposed for processing convenience, safety, or the like, and the clear zone is optional. Based on a need, the electrode plate can include 0, 1, or 2 clear zones (one clear zone on each outer side of the two zones with the low compacted density).

In this application, a ratio of the zone with the high compacted density to a total coated zone, that is, a ratio of a width of the zone 514 to a sum of a width of the zone 513, a width of the zone 514, and a width of the zone 515 in this instance, may be, for example, 20% to 80%, preferably 30% to 70%, preferably 40% to 60%, and more preferably 45% to 55%. Widths of the two zones with low compacted density may be the same or different.

In this application, the compacted density of the zone with the low compacted density may be approximately 5% to 30%, such as 7% to 25%, 8% to 20%, or 8% to 18%, lower than the compacted density of the zone with the high compacted density.

[Electrochemical Device]

The second aspect of this application relates to an electrochemical device, including a positive electrode plate, a negative electrode plate, a separator, and an electrolyte, where the positive electrode plate and/or the negative electrode plate is the electrode plate according to the first aspect of this application.

The electrochemical device may be a capacitor, a primary battery, or a secondary battery. For example, the electrochemical device may be a lithium-ion capacitor, a lithium-ion primary battery, or a lithium-ion secondary battery. A method for constructing and preparing the electrochemical device is well known, except the positive electrode plate and/or the negative electrode plate used in this application. Because the electrode plate in this application is used, the electrochemical device can have improved safety (for example, nail penetration safety) and electrical performance. In addition, because the electrode plate in this application can be easily processed, manufacturing costs of the electrochemical device using the electrode plate in this application can be reduced.

In the electrochemical device in this application, specific type and composition of the separator and the electrolyte are not specifically limited, and may be selected based on an actual requirement. Specifically, the separator may be selected from a polyethylene film, a polypropylene film, a polyvinylidene fluoride film, non-woven fabrics, and a multilayer composite film thereof. When the battery is a lithium-ion battery, a non-aqueous electrolyte is generally used as its electrolyte. As the non-aqueous electrolyte, a lithium salt solution dissolved in an organic solvent is generally used. The lithium salt is, for example, an inorganic lithium salt such as $LiClO_4$, $LiPF_6$, $LiBF_4$, $LiAsF_6$, or $LiSbF_6$, or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, or $LiCnF_{2n+1}SO_3$ ($n\geq2$). The organic solvent used in the non-aqueous electrolyte is, for example, cyclic carbonate such as vinyl carbonate, propylene carbonate, butene carbonate, and vinylene carbonate, chain carbonate such as dimethyl carbonate, diethyl carbonate, and methyl ethyl carbonate, chain ester such as methyl propionate, cyclic ester such as γ-butyrolactone, chain ether such as dimethoxyethane, diethyl ether, diethylene glycol dimethyl ether, and triethylene glycol dimethyl ether, cyclic ether such as tetrahydrofuran and 2-methyltetrahydrofuran, nitrile such as acetonitrile and propionitrile, or a mixture of these solvents.

In some embodiments, the electrochemical device may include an outer package for encapsulating the positive electrode plate, the negative electrode plate, and an electrolyte. In an example, the positive electrode plate, the negative electrode plate, and the separator may be laminated or wound to form an electrode assembly of a laminated structure or an electrode assembly of a wound structure, and the electrode assembly is encapsulated in an outer package. The electrolyte may be a liquid electrolyte, and the liquid electrolyte infiltrates into the electrode assembly. There may be one or more electrode assemblies in the electrochemical device, and the quantity of the electrode assemblies may be adjusted as required.

In some embodiments, the outer package of the electrochemical device may be a soft package, for example, a soft bag. The material of the soft package may be plastic, for example, may include one or more of polypropylene PP, polybutylene terephthalate PBT, polybutylene succinate PBS, and the like. Alternatively, the outer package of the electrochemical device may be a hard shell, for example, an aluminum shell.

Figure 18:
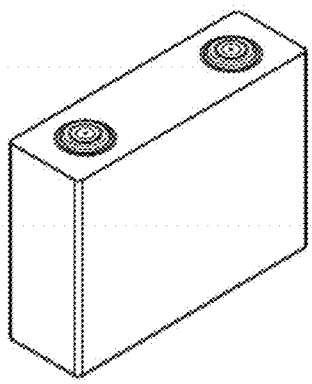
FIG. 18 is a schematic diagram of an embodiment of an electrochemical device according to this application.

This application sets no particular limitation on the shape of the electrochemical device, and the electrochemical device may have a cylindrical, square, or any other shape. FIG. 18 shows an electrochemical device 5 of a square structure used as an example.

In some embodiments, electrochemical devices may be assembled into a battery module, and the battery module may include a plurality of electrochemical devices. A specific quantity may be adjusted based on application and capacity of the battery module.

Figure 19:
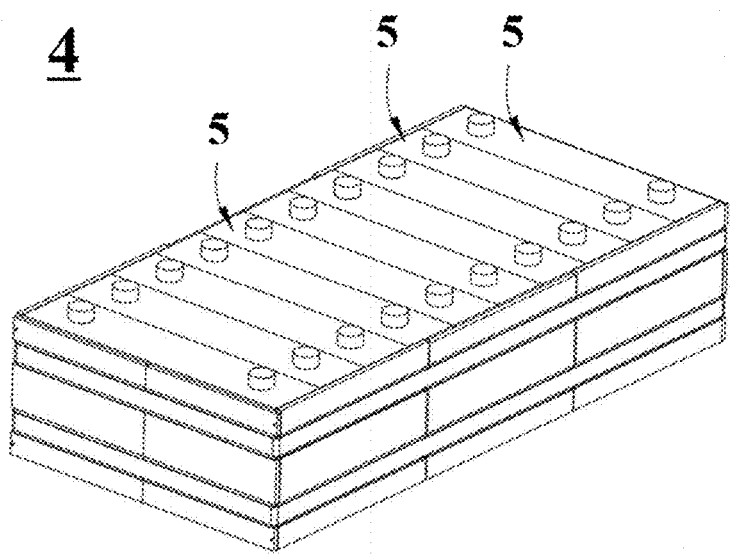
FIG. 19 is a schematic diagram of an embodiment of a battery module according to this application.

FIG. 19 shows a battery module 4 used as an example. Referring to FIG. 19, in a battery module 4, a plurality of electrochemical devices 5 may be arranged in sequence in the length direction of the battery module 4. Certainly, the electrochemical devices may alternatively be arranged in any other manner. Further, the plurality of electrochemical devices 5 may be fastened by using fasteners.

Optionally, the battery module 4 may further include a housing with accommodating space, and the plurality of electrochemical devices 5 are accommodated in the accommodating space.

In some embodiments, battery modules may be further assembled into a battery pack, and a quantity of battery modules included in the battery pack may be adjusted based on application and capacity of the battery pack.

Figure 20:
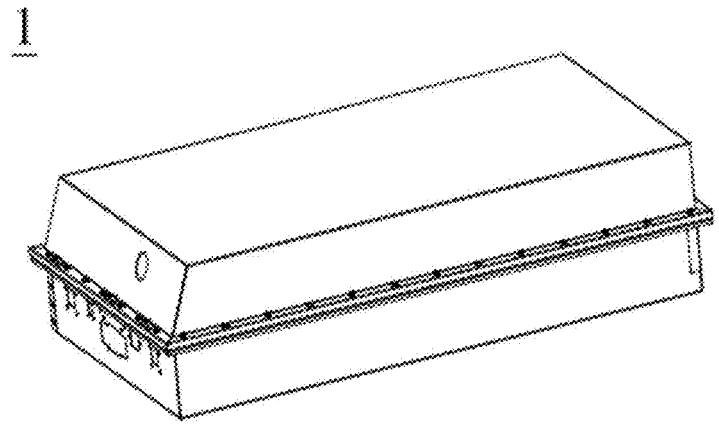
FIG. 20 is a schematic diagram of an embodiment of a battery pack according to this application.
Figure 21:
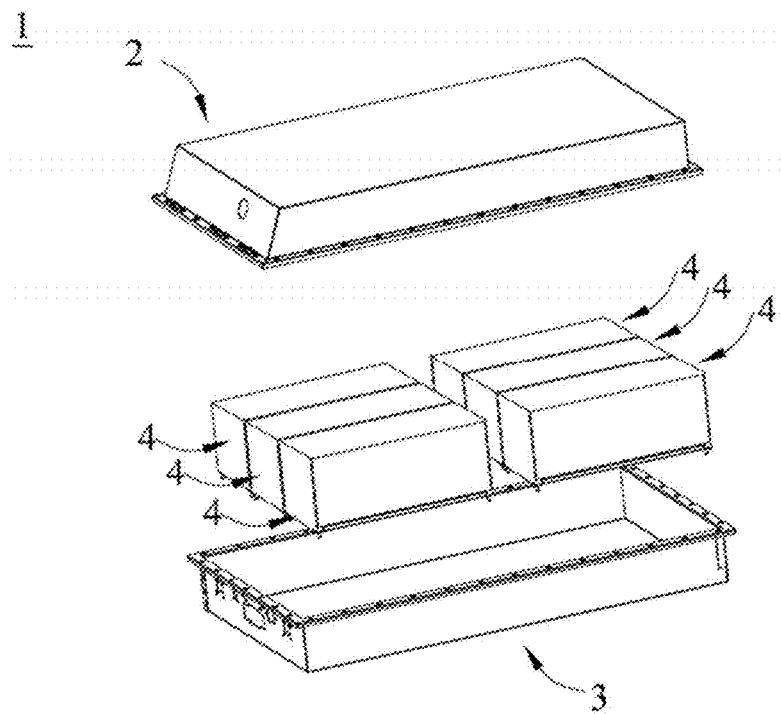
FIG. 21 is an exploded view of FIG. 20.

FIG. 20 and FIG. 21 show a battery pack 1 used as an example. Referring to FIG. 20 and FIG. 21, the battery pack 1 may include a battery box and a plurality of battery modules 4 arranged in the battery box. The battery box includes an upper box body 2 and a lower box body 3. The upper box body 2 can cover the lower box body 3 to enclose a space for accommodating the battery modules 4. The plurality of battery modules 4 may be arranged in the battery box in any manner.

[Apparatus]

The third aspect of this application relates to an apparatus, including the electrochemical device according to the second aspect of this application. The electrochemical device may be used as a power source for the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

The electrochemical device, a battery module, or a battery pack may be selected for the apparatus according to use requirements for the apparatus.

Figure 22:
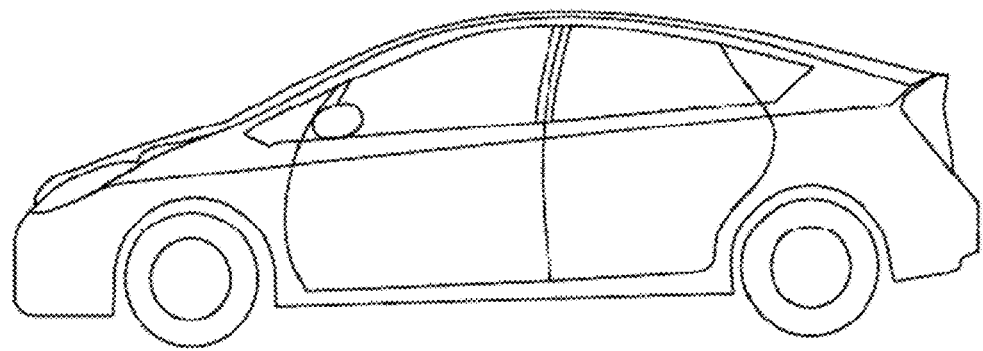
FIG. 22 is a schematic diagram of an embodiment of an apparatus using an electrochemical device as a power source according to this application.

FIG. 22 shows an apparatus used as an example. The apparatus is a battery electric vehicle, a hybrid electric vehicle, a plug-in hybrid electric vehicle, or the like. To meet a requirement of the apparatus for high power and high energy density of the electrochemical device, a battery pack or a battery module may be used.

In another example, the apparatus may be a mobile phone, a tablet computer, a notebook computer, or the like. The apparatus usually requires lightness and thinness, and the electrochemical device may be used as a power source.

A person skilled in the art may understand that the foregoing definitions or preferred ranges of component selection, component content, and material physicochemical performance parameters in electrode plates, electrode active material layers, and the like in different embodiments of this application may be randomly combined, and various embodiments obtained through the combination shall still fall within the scope of this application and shall be considered as a part of content disclosed in this specification.

Unless otherwise specified, various parameters in this specification have general meanings well known in the art, and may be measured by using a method well known in the art. For example, a test may be conducted in a method provided in an embodiment of this application. In addition, preferred ranges and options of different parameters provided in various preferred embodiments may be randomly combined, and it is considered that various combinations obtained shall fall within the disclosed scope of this application.

The following further describes beneficial effects of this application with reference to examples.

Examples (I) Preparation of a Current Collector

Current collectors used in the electrode plates in examples and comparative examples were prepared as follows:

1. Preparation of a Current Collector without a Protective Layer:

A support layer of a specific thickness was selected, and a conductive layer of a specific thickness was formed on a surface of the support layer through vacuum evaporating, mechanical roll-in, or bonding.

(1) The forming conditions of the vacuum evaporation method are as follows: The support layer subjected to surface cleaning treatment was placed into a vacuum evaporation chamber, and high-purity metal wires in the metal evaporation chamber were melted and evaporated at a high temperature of 1600° C. to 2000° C. The evaporated metal went through the cooling system in the vacuum evaporation chamber, and finally was deposited on the surface of the support layer to form a conductive layer.

(2) The forming conditions of the mechanical roll-in method are as follows: The foil of the conductive layer material was placed in a mechanical roller, and compacted to a predetermined thickness through rolling by applying pressure of 20 t to 40 t, and then placed onto the surface of the support layer on which surface cleaning processing had been performed. Finally, the two were placed in the mechanical roller to be tightly bonded by applying pressure of 30 t to 50 t.

(3) The forming conditions of the bonding method are as follows: The foil of the conductive layer material was placed in a mechanical roller, and rolling compacted to a predetermined thickness by applying a pressure of 20 t to 40 t, and then the surface of the support layer subjected to surface cleaning treatment was coated with a mixed solution of PVDF and NMP. Finally, the conductive layer of the predetermined thickness was adhered to the surface of the support layer, and dried at 100° C.

2. Preparation of a Current Collector with a Protective Layer:

The current collector with the protective layer may be prepared in the following manners:

(1) First, a protective layer was disposed on a surface of a support layer by using a vapor deposition method or a coating method, and then a conductive layer of a specified thickness was formed on the surface of the support layer with the protective layer through vacuum evaporating, mechanical roll-in, or bonding to prepare a current collector with a protective layer (the protective layer was located between the support layer and the conductive layer). In addition, on the basis of the above, another protective layer was formed on the surface of the conductive layer farther away from the support layer by using a vapor deposition method, an in-situ formation method, or a coating method to prepare a current collector with protective layers (the protective layers were located on two opposite surfaces of the conductive layer).

(2) First, a protective layer was formed on one surface of the conductive layer by using a vapor deposition method, an in-situ formation method, or a coating method, and then the above conductive layer with the protective layer was disposed on the surface of the support layer through mechanical roll-in or bonding, with the protective layer located between the support layer and the conductive layer, to prepare a current collector with a protective layer (the protective layer was located between the support layer and the conductive layer). In addition, on the basis of the above, another protective layer was formed on the surface of the conductive layer farther away from the support layer by using a vapor deposition method, an in-situ formation method, or a coating method to prepare a current collector with protective layers (the protective layers were located on two opposite surfaces of the conductive layer).

(3) First, a protective layer was formed on one surface of the conductive layer by using a vapor deposition method, an in-situ formation method, or a coating method, and then the above conductive layer with the protective layer was disposed on the surface of the support layer through mechanical roll-in or bonding, with the protective layer located on the surface of the support layer farther away from the conductive layer, to prepare a current collector with a protective layer (the protective layer was located on the surface of the support layer farther away from the conductive layer).

(4) First, protective layers were formed on two surfaces of the conductive layer by using a vapor deposition method, an in-situ formation method, or a coating method, and then the above conductive layer with the protective layers was disposed on the surface of the support layer through mechanical roll-in or bonding to prepare a current collector with protective layers (the protective layers were located on two opposite surfaces of the conductive layer).

(5) On the basis of the above "preparation of a current collector without a protective layer", another protective layer was formed on the surface of the conductive layer farther away from the support layer by using a vapor deposition method, an in-situ formation method, or a coating method to prepare a current collector with a protective layer (the protective layer was located on the surface of the support layer farther away from the conductive layer).

In the preparation instance, for the vapor deposition method, a vacuum evaporating method was used; for the in-situ formation method, an in-situ passivation method was used; and for the coating method, a doctor blade coating method was used.

The forming conditions of the vacuum evaporation method are as follows: A sample subjected to surface cleaning treatment was placed into a vacuum evaporation chamber, and the protective layer material in the evaporation chamber was melted and evaporated at a high temperature of 1600° C. to 2000° C. The evaporated protective layer material went through the cooling system in the vacuum evaporation chamber, and finally was deposited on the surface of the sample to form a protective layer.

The forming conditions of the in-situ passivation method are as follows: The conductive layer was placed in a high-temperature oxidation environment, the temperature was controlled at 160° C. to 250° C., the oxygen supply was maintained in the high-temperature environment, and the processing time was 30 minutes, thereby forming a metal oxide type protective layer.

The formation conditions of the gravure coating method are as follows: The protective layer material and NMP were stirred and mixed, and then a slurry with the above protective layer material (solid content was 20% to 75%) was applied on the surface of the sample, and then the thickness of the coating was controlled by a gravure roller, and finally the coating was dried at 100° C. to 130° C.

(II) Impact of Zone Distribution of an Electrode Active Material Layer on Performance of an Electrode Plate The following describes impact of the electrode active material layer and the electrode plate obtained by using the partition coating method on the performance of the electrode plate according to the embodiments of this application. In this application, the following three different types of positive electrode plates and negative electrode plates were respectively compared in terms of flatness.

(1) Positive Electrode Plate Obtained Through Partition Coating:

The used composite current collector had two surfaces of 10 μm PET on which an Al layer with a thickness of 1 μm was vapor-deposited.

A 92 wt % positive electrode active material NCM333, a 5 wt % conductive agent Super-P ("SP" for short), and a 3 wt % PVDF were mixed with a solvent NMP, and stirred well to prepare a positive electrode active material layer slurry.

Partition coating was performed on two surfaces of the composite current collector through extrusion coating. That is, a middle zone was a zone with a high coating weight, and zones on two sides were zones with a low coating weight (which could be implemented by extruding a spacer or a baffle plate), and drying was performed at 85° C. The width of the zone with the high coating weight was 4 cm, and both widths of the zones with the low coating weight were 2.1 cm.

Then cold-pressing and cutting were performed, and drying was performed for four hours in an 85° C. vacuum condition, and tabs were welded, thereby obtaining a positive electrode plate.

Compacted density of the zone with a high coating weight was 3.45 g/cm$^3$, and compacted density of both the zones with a low coating weight was 3.3 g/cm$^3$.

A compacted density testing method: 30 wafers with areas of S were first cut from the current collector, and weight and thickness of the 30 wafers were measured. An average weight $m_1$ and an average height $H_1$ were calculated. 30 wafers with areas of S were then cut from the electrode plate, and an average weight $m_2$ and an average height $H_2$ were calculated. In this way:

$$\text{Compacted density}=(m_2-m_1)/((H_2-H_1)\times S).$$

(2) Evenly Coated Comparative Positive Electrode Plate

The foregoing composite current collector with Al-coated PET with a thickness of 10 μm was also used as the current collector, and was prepared in a method similar to the preparation method of the foregoing positive electrode plate. However, the positive electrode active material layer slurry was directly evenly applied on two surfaces of the composite current collector. That is, no partitioning processing was performed. Then, post-processing was performed to obtain an evenly coated comparative positive electrode plate. Compacted density of the positive electrode active material layer was 3.4 g/cm$^3$.

(3) Conventional Positive Electrode Plate

The current collector was Al foil with a thickness of 12 μm. Similar to that in the preparation method of the above comparative positive electrode plate, the positive electrode active material layer slurry was evenly directly applied on two surfaces of the current collector of the Al foil, and then the conventional positive electrode plate was obtained through post-processing.

(4) Negative Electrode Plate Obtained Through Partition Coating

The used composite current collector had two surfaces of 10 μm PET on which a Cu layer with a thickness of 1 μm was vapor-deposited.

A negative electrode active material artificial graphite, a conductive agent Super-P, a thickener CMC, and a binder SBR were added to a deionized water solvent at a mass ratio of 96.5:1.0:1.0:1.5, and mixed well to prepare a negative electrode active material layer slurry.

Partition coating was performed on two surfaces of the composite current collector through extrusion coating. That is, the middle zone was a zone with a high coating weight, and zones on two sides were zones with a low coating weight (which could be implemented by extruding a spacer or a baffle plate), and drying was performed at 85° C. to obtain the negative electrode active material layer. The width of the zone with the high coating weight was 4.5 cm, and both widths of the zones with the low coating weight were 2 cm.

Then the current collector having various coating layers was cold-pressed and cut, and dried for four hours in a 110° C. vacuum condition, and tabs were welded, thereby obtaining a negative electrode plate.

Compacted density of the zone with a high coating weight was 1.7 g/cm$^3$, and compacted density of both the zones with a low coating weight was 1.6 g/cm$^3$.

(5) Evenly Coated Comparative Negative Electrode Plate

The foregoing composite current collector with Cu-coated PET with a thickness of 10 μm was also used as the current collector, and was prepared by using a method similar to the preparation method of the foregoing negative electrode plate except that the negative electrode active material layer slurry was directly evenly applied on two surfaces of the composite current collector, that is, no partitioning processing was performed. Then, post-processing was performed to obtain an evenly coated comparative negative electrode plate. Compacted density of the negative electrode active material layer was 1.65 g/cm$^3$.

(6) Conventional Negative Electrode Plate

The current collector was Cu foil with a thickness of 8 μm. Similar to that in the preparation method of the foregoing comparative negative electrode plate that was evenly coated, the negative electrode active material layer slurry was directly evenly applied on the surface of the current collector of the Cu foil, and then the conventional negative electrode plate was obtained through post-processing.

Flatness of the foregoing six different electrode plates was measured. A flatness test of the electrode plate was conducted by measuring an arc height of the electrode plate relative to a reference plane. The arc height was measured specifically as follows:

An electrode plate sample of a length of 2 m was taken, placed on the reference plane, and expanded in a width direction of the plane, where the width of the plane was slightly less than a length of the electrode plate sample. Heavy objects with a same weight (1 Kg) were then placed on both sides of the sample, so that the sample was attached to the plane. Then a soft ruler was used to measure a height of a middle zone of the sample above the plane, and the height above the plane was the arc height. During actual production, the electrode plate with an arc height less than or equal to 2 mm was usually considered to be flat, and the positive electrode plate and the negative electrode plate can be accurately aligned when assembled into a battery.

The following table shows specific measurement results:

| Electrode plate | Arc height |
| --- | --- |
| Positive electrode plate obtained through partition coating | Less than 2 mm |
| Evenly coated comparative positive electrode plate | Greater than 5 mm |
| Conventional positive electrode plate | Less than 2 mm |
| Negative electrode plate obtained through partition coating | Less than 2 mm |
| Evenly coated comparative negative electrode plate: | Greater than 5 mm |
| Conventional negative electrode plate | Less than 2 mm |

It can be learned from the measurement results in the foregoing table that, the conventional positive electrode plate or negative electrode plate using a metal current collector met a requirement for flatness of the electrode plate (the arc height was less than or equal to 2 mm), which could implement accurate alignment during battery assembly. However, if the composite current collector was evenly coated according to the conventional process, the arc height of the electrode plate was relatively great (greater than 5 mm), the flatness of the electrode plate was not desirable, which made it difficult to implement accurate alignment during battery assembly. However, after the partition coating process in this application was used, the arc height was significantly reduced, which was similar to that of the conventional electrode plate, thereby implementing accurate alignment during battery assembly. It can be learned that the special design of the partition coating according to this application could eliminate or reduce possible edge warpage and curvature of the electrode plate including the composite current collector after roll-in, and implement accurate alignment during battery assembly. In addition, the battery could also have excellent electrochemical performance and safety performance brought by the composite current collector.

(III) Effect of Other Factors Such as a Structure and Composition of an Electrode Plate on Improvement of Electrochemical Performance of a Battery The following describes the impact of other structures and composition of the electrode plates (for example, the composition of the current collector, existence of a conductive primer layer, and composition of the electrode active material layer) on battery performance.

1. Preparation of an Electrode Plate:
(1) Positive Electrode Plate without a Conductive Primer Layer:

A 92 wt % positive electrode active material (NCM333 was used by default), a 5 wt % conductive agent Super-P ("SP" for short), and a 3 wt % PVDF were mixed with a solvent NMP, and stirred well to prepare a positive electrode active material layer slurry (composition of the active material layer slurry in some examples might vary, and in this case, specified composition in the examples should prevail). Extrusion coating was performed to apply, through partition coating, the positive electrode active material layer slurry on two surfaces of the composite current collector prepared by using the foregoing method, and drying was performed at 85° C. to obtain a positive electrode active material layer.

Then the current collector having various coating layers was cold-pressed and cut, and dried for four hours in an 85° C. vacuum condition, and tabs were welded, thereby obtaining a positive electrode plate.

(2) Conventional Positive Electrode Plate:

The current collector was Al foil with a thickness of 12 μm. Similar to the preparation method of the foregoing positive electrode plate, the positive electrode active material layer slurry was directly applied on the surface of the current collector of the Al foil, and then the conventional positive electrode plate was obtained through post-processing.

(3) Positive Electrode Plate with a Conductive Primer Layer:

A conductive material (for example, conductive carbon black), a binder (for example, PVDF or polyacrylic acid), and an optional active material were dissolved in an appropriate solvent (for example, NMP or water) at a specified ratio, and stirred well to form a primer slurry.

Two surfaces of the composite current collector were evenly coated with the primer slurry at a coating speed of 20 m/min, and a primer layer was dried, where oven temperature was 70° C. to 100° C., and drying time was 5 min.

After the primer layer was completely dried, a 92 wt % positive electrode active material (NCM333 was used by default), a 5 wt % conductive agent Super-P ("SP" for short), and a 3 wt % PVDF were mixed with a solvent NMP, and stirred well to prepare a positive electrode active material layer slurry. Extrusion coating was performed to apply the positive electrode active material layer slurry on the surface of the primer layer through partition coating, and drying was performed at 85° C. to obtain the positive electrode active material layer. Then a positive electrode plate with a conductive primer layer was obtained through post-processing.

(4) Negative Electrode Plate without a Conductive Primer Layer:

A negative electrode active material artificial graphite, a conductive agent Super-P, a thickener CMC, and a binder SBR were added to a deionized water solvent at a mass ratio of 96.5:1.0:1.0:1.5, and mixed well to prepare a negative electrode active material layer slurry. Extrusion coating was performed to apply, through partition coating, the negative electrode active material layer slurry on two surfaces of the composite current collector prepared by using the foregoing method, and drying was performed at 85° C. to obtain a negative electrode active material layer.

Then the current collector having various coating layers was cold-pressed and cut, and dried for four hours in a 110° C. vacuum condition, and tabs were welded, thereby obtaining a negative electrode plate.

(5) Conventional Negative Electrode Plate:

The current collector was Cu foil with a thickness of 8 μm. Similar to that in the preparation method of the above negative electrode plate without a conductive primer layer, the negative electrode active material layer slurry was directly applied on the surface of the current collector of the Cu foil, and then the conventional negative electrode plate was obtained through post-processing.

(6) Negative Electrode Plate with a Conductive Primer Layer:

A conductive material (for example, conductive carbon black), a binder (for example, PVDF or polyacrylic acid), and an optional active material were dissolved in an appropriate solvent (for example, NMP or water) at a specified ratio, and stirred well to form a primer slurry.

The two surfaces of the composite current collector were evenly coated with the primer slurry at a coating speed of 20 m/min, and a primer layer was dried, where oven temperature was 70° C. to 100° C., and drying time was 5 min.

After the primer layer was completely dried, a negative electrode active material artificial graphite, a conductive agent Super-P, a thickener CMC, and a binder SBR were added to a deionized water solvent at a mass ratio of 96.5:1.0:1.0:1.5, and mixed well to prepare a negative electrode active material layer slurry. Extrusion coating was performed to apply, through partition coating, the negative electrode active material layer slurry on the surface of the primer layer, and drying was performed at 85° C. to obtain the negative electrode active material layer. Then the negative electrode plate with a conductive primer layer was obtained through post-processing.

In a preparation process of the foregoing electrode plate, for the composite current collector, to obtain the even electrode plate, the active material slurry was applied in the partition coating method in this application. For specific parameter settings of the partition coating, such as a width, compacted density, and the like of each zone, settings similar to those described in the previous sections of "Positive electrode plate obtained through partition coating" and "Negative electrode plate obtained through partition coating" were used.

2. Preparation of a Battery:

Through a common battery manufacturing process, a positive electrode plate (compacted density: 3.4 g/cm$^3$), a PP/PE/PP separator, and a negative electrode plate (compacted density: 1.6 g/cm$^3$) were wound together to form a bare battery assembly, then the bare electrode assembly was placed into a battery housing, the electrolyte (an EC:EMC volume ratio was 3:7, and LiPF$_6$ was 1 mol/L) was injected, and then sealing, formation, and other processes were performed to finally obtain a lithium-ion secondary battery (hereinafter referred to as the battery).

3. Battery Testing Method:

(1) Lithium-Ion Battery Cycle Life Testing Method:

Method 1: The lithium-ion battery was charged and discharged at 45° C. That is, the lithium-ion battery was charged to 4.2 V at a current of 1 C, and then discharged to 2.8 V at a current of 1 C, and the discharge capacity during a first cycle was recorded. 1000 cycles of 1 C/1 C charge and discharge were then performed on the battery, and the battery discharge capacity during a 1000$^{th}$ cycle was recorded. The discharge capacity during the 1000$^{th}$ cycle was divided by the discharge capacity during the first cycle to obtain the capacity retention rate during the 1000$^{th}$ cycle.

Method 2: The lithium-ion battery was charged and discharged at 45° C. That is, the lithium-ion battery was charged to 4.2 V at a current of 0.3 C, and then discharged to 2.8 V at a current of 0.3 C, and the discharge capacity during a first cycle was recorded. 1000 cycles of 0.3 C/0.3 C charge and discharge were then performed on the battery, and the battery discharge capacity during a 1000$^{th}$ cycle was recorded. The discharge capacity during the 1000$^{th}$ cycle was divided by the discharge capacity during the first cycle to obtain the capacity retention rate during the 1000$^{th}$ cycle.

(2) DCR Growth Rate Testing Method:

At 25° C., the secondary battery was adjusted to 50% SOC at a current of 1 C, and a voltage U1 was recorded. Then the battery was discharged at a current of 4 C for 30 seconds, and a voltage U2 was recorded. DCR=(U1−U2)/4 C. Then the battery was charged and discharged for 500 cycles at a current of 1 C/1 C, and DCR in a 500$^{th}$ cycle was recorded. The DCR in the 500$^{th}$ cycle was divided by the DCR in the first cycle, then 1 was subtracted, and a DCR growth rate in the 500$^{th}$ cycle was obtained.

(3) Needle Penetration Test:

The secondary batteries (10 samples) were fully charged to the cut-off voltage at a current of 1 C, and then charged at a constant voltage until the current dropped to 0.05 C, and then charging was stopped. A φ8 mm high temperature resistant steel needle was used to penetrate at a speed of 25 mm/s from a direction perpendicular to a battery electrode plate, and the penetration position needed to be close to the geometric center of the punctured surface. Whether the battery had a phenomenon of burning and explosion while the steel needle stayed in the battery was observed.

4. Test Results and Discussion:

4.1 Effect of a Composite Current Collector on Improvement of Mass Energy Density of a Battery Specific parameters of the current collector and the electrode plate in the examples are shown in Table 1 (no current collector in the examples listed in Table 1 is provided with a protective layer). In Table 1, for the positive electrode current collector, the weight percentage of the current collector refers to a percentage obtained by dividing the weight of the positive electrode current collector per unit area by the weight of the conventional positive electrode current collector per unit area. For the negative electrode current collector, the weight percentage of the current collector refers to a percentage obtained by dividing the weight of the negative electrode current collector per unit area by the weight of the conventional negative electrode current collector per unit area.

TABLE 1

| Electrode plate number | Current collector number | Support layer Material | D1 | Conductive layer Material | D2 | Current collector thickness | Weight percentage of current collector |
|---|---|---|---|---|---|---|---|
| Positive electrode plate 1 | Positive electrode current collector 1 | PI | 6 μm | Al | 300 nm | 6.6 μm | 30.0% |
| Positive electrode plate 2 | Positive electrode current collector 2 | PET | 4 μm | Al | 500 nm | 5 μm | 24.3% |
| Positive electrode plate 3 | Positive electrode current collector 3 | PET | 2 μm | Al | 200 nm | 2.4 μm | 11.3% |
| Positive electrode plate 4 | Positive electrode current collector 4 | PET | 10 μm | Al | 1 μm | 12 μm | 56.5% |
| Positive electrode plate 5 | Positive electrode current collector 5 | PET | 10 μm | Al | 1.5 μm | 13 μm | 65% |
| Positive electrode plate 6 | Positive electrode current collector 6 | PET | 10 μm | Al | 2 μm | 14 μm | 73.5% |
| Conventional positive electrode plate | Conventional positive electrode current collector | / | / | Al | / | 12 μm | 100% |
| Negative electrode plate 1 | Negative electrode current collector 1 | PET | 5 μm | Cu | 500 nm | 6 μm | 21.6% |
| Negative electrode plate 2 | Negative electrode current collector 2 | PI | 2 μm | Cu | 800 nm | 3.6 μm | 23.8% |
| Negative electrode plate 3 | Negative electrode current collector 3 | PET | 8 μm | Cu | 1 μm | 10 μm | 39.6% |

TABLE 1-continued

| Electrode plate number | Current collector number | Support layer Material | D1 | Conductive layer Material | D2 | Current collector thickness | Weight percentage of current collector |
|---|---|---|---|---|---|---|---|
| Negative electrode plate 4 | Negative electrode current collector 4 | PET | 6 μm | Cu | 1.5 μm | 9 μm | 48.5% |
| Negative electrode plate 5 | Negative electrode current collector 5 | PET | 4 μm | Cu | 1.2 μm | 6.4 μm | 37.3% |
| Negative electrode plate 6 | Negative electrode current collector 6 | PET | 10 μm | Cu | 200 nm | 10.4 μm | 23.3% |
| Negative electrode plate 7 | Negative electrode current collector 7 | PI | 8 μm | Cu | 2 μm | 12 μm | 65.3% |
| Conventional negative electrode plate | Conventional negative electrode current collector | / | / | Cu | / | 8 μm | 100% |

It may be learned from Table 1 that, compared with the conventional current collector, weights of both the composite positive electrode current collector and the composite negative electrode current collector according to this application were reduced to some degree, thereby improving the mass energy density of the battery. However, when the thickness of the conductive layer was greater than 1.5 μm, the weight reduction degree of the current collector became smaller, especially for the negative electrode current collector.

4.2 Effect of a Protective Layer on Improvement of Electrochemical Performance of a Composite Current Collector On the basis of the current collector of each example listed in Table 1, a protective layer was further formed to investigate the effect of a protective layer on improvement of the electrochemical performance of the composite current collector. The "positive electrode current collector 2-1" in Table 2 means a current collector obtained by forming a protective layer on the basis of the "positive electrode current collector 2" in Table 1. Numbers of other current collectors have similar meanings.

TABLE 2

| Electrode plate number | Current collector number | Upper protective layer Material | D3' | Lower protective layer Material | D3" |
|---|---|---|---|---|---|
| Positive electrode plate 2-1 | Positive electrode current collector 2-1 | Nickel oxide | 10 nm | Nickel oxide | 8 nm |
| Positive electrode plate 2-2 | Positive electrode current collector 2-2 | Nickel oxide | 50 nm | Nickel oxide | 30 nm |
| Negative electrode plate 4-1 | Negative electrode current collector 4-1 | — | — | Nickel | 200 nm |
| Negative electrode plate 4-2 | Negative electrode current collector 4-2 | Nickel | 5 nm | — | — |
| Negative electrode plate 4-3 | Negative electrode current collector 4-3 | Nickel-based alloy | 100 nm | — | — |
| Negative electrode plate 4-4 | Negative electrode current collector 4-4 | Nickel | 10 nm | Nickel | 10 nm |
| Negative electrode plate 4-5 | Negative electrode current collector 4-5 | Nickel | 50 nm | Nickel | 50 nm |
| Negative electrode plate 4-6 | Negative electrode current collector 4-6 | Nickel | 100 nm | Nickel | 50 nm |

Table 3 shows cycling performance data measured after a battery is assembled by using an electrode plate (without a conductive primer layer) listed in Table 2.

TABLE 3

| Battery number | Electrode plate | | Capacity retention rate at 45° C. in the $1000^{th}$ cycle (method 1) |
|---|---|---|---|
| Battery 1 | Conventional negative electrode plate | Conventional positive electrode plate | 86.5% |
| Battery 2 | Conventional negative electrode plate | Positive electrode plate 2 | 80.7% |
| Battery 3 | Conventional negative electrode plate | Positive electrode plate 2-1 | 85.2% |
| Battery 4 | Conventional negative electrode plate | Positive electrode plate 2-2 | 85.4% |
| Battery 5 | Negative electrode plate 4 | Conventional positive electrode plate | 86.3% |
| Battery 6 | Negative electrode plate 4-1 | Conventional positive electrode plate | 87.1% |

TABLE 3-continued

| Battery number | Electrode plate | | Capacity retention rate at 45° C. in the 1000th cycle (method 1) |
|---|---|---|---|
| Battery 7 | Negative electrode plate 4-2 | Conventional positive electrode plate | 86.5% |
| Battery 8 | Negative electrode plate 4-3 | Conventional positive electrode plate | 86.7% |
| Battery 9 | Negative electrode plate 4-4 | Conventional positive electrode plate | 87.6% |
| Battery 10 | Negative electrode plate 4-5 | Conventional positive electrode plate | 87.8% |
| Battery 11 | Negative electrode plate 4-6 | Conventional positive electrode plate | 88.0% |

As shown in Table 3, compared with the battery 1 using the conventional positive electrode plate and the conventional negative electrode plate, the battery using the composite current collector had good cycle life and had cycling performance equivalent to that of the conventional battery. Especially for a battery manufactured by using a current collector with a protective layer, compared with a battery manufactured by using a current collector without a protective layer, a capacity retention rate of the battery could be further improved, which indicates that the battery is more reliable.

4.3 Effect of a Composite Current Collector on Improvement of Nail Penetration Safety of a Battery The following describes the effect of the composite current collector on the improvement of the nail penetration safety of the battery by using the positive electrode plate as an example.

TABLE 4

| Electrode plate number | Support layer Material | D1 | Conductive layer Material | D2 | Electrode active material layer Material | D4 | $D_{total}/D1$ 2D4/D1 |
|---|---|---|---|---|---|---|---|
| Positive electrode plate 11 | PI | 2 μm | Al | 800 nm | NCM811 | 55 μm | 55 |
| Positive electrode plate 12 | PI | 5 μm | Al | 2 μm | NCM811 | 55 μm | 22 |
| Positive electrode plate 13 | PI | 6 μm | Al | 300 nm | NCM811 | 55 μm | 18.3 |
| Positive electrode plate 14 | PET | 5 μm | Al | 500 nm | NCM811 | 55 μm | 22 |
| Positive electrode plate 15 | PET | 10 μm | Al | 1 μm | NCM811 | 55 μm | 11 |
| Positive electrode plate 16 | PET | 8 μm | Al | 1.5 μm | NCM811 | 55 μm | 13.7 |

(No conductive primer layer was disposed on electrode plates in Table 4)

TABLE 5

| Battery number | Positive electrode plate | Negative electrode plate | Nail penetration test result |
|---|---|---|---|
| Battery 20 | Conventional positive electrode plate | Conventional negative electrode plate | All failed |
| Battery 21 | Positive electrode plate 11 | Conventional negative electrode plate | All passed |
| Battery 22 | Positive electrode plate 12 | Conventional negative electrode plate | All passed |
| Battery 23 | Positive electrode plate 13 | Conventional negative electrode plate | All passed |
| Battery 24 | Positive electrode plate 14 | Conventional negative electrode plate | All passed |
| Battery 25 | Positive electrode plate 15 | Conventional negative electrode plate | All passed |
| Battery 26 | Positive electrode plate 16 | Conventional negative electrode plate | All passed |

Because a lithium-ion battery using the composite current collector had a thinner conductive layer than the conventional metal current collector, metal fins generated in an abnormal case such as nail penetration were relatively small, and a support layer of the composite current collector had larger short-circuit resistance, thereby improving nail penetration safety performance of the battery. It may be learned from the foregoing table that, the conventional battery had thermal runaway and destruction in the nail penetration case and could not pass the nail penetration safety test. All lithium-ion batteries using the composite current collector could pass the nail penetration safety test.

4.4 Effect of a Conductive Primer Layer on Improvement of Electrochemical Performance of a Battery The following uses the positive electrode plate as an example to illustrate effects of the conductive primer layer and composition of the conductive primer layer on improvement of the electrochemical performance of the battery. The table below shows specific compositions and related parameters of batteries and the electrode plates and current collectors used therein in examples and comparative examples (except the comparative positive electrode plate 20, all positive electrode plates were provided with a conductive primer layer).

TABLE 6

| Electrode plate number | Current collector number | Support layer Material | D1 | Conductive layer Material | D2 | Conductive primer layer | Electrode active material layer |
|---|---|---|---|---|---|---|---|
| Comparative positive electrode plate 20 | Positive electrode current collector 4 | PET | 10 μm | Al | 1 μm | / | NCM333, D50 9.8 μm, an active material layer |

TABLE 6-continued

| Electrode plate number | Current collector number | Support layer Material | D1 | Conductive layer Material | D2 | Conductive primer layer | Electrode active material layer |
|---|---|---|---|---|---|---|---|
| | | | | | | | with a thickness of 55 μm |
| Positive electrode plate 21 | Positive electrode current collector 4 | PET | 10 μm | Al | 1 μm | 10% conductive carbon black, 90% aqueous polyacrylic acid, with a thickness of 1.5 μm | Same as the above |
| Positive electrode plate 22 | Positive electrode current collector 4 | PET | 10 μm | Al | 1 μm | 20% conductive carbon black, 80% aqueous polyacrylic acid, with a thickness of 1.5 μm | Same as the above |
| Positive electrode plate 23 | Positive electrode current collector 4 | PET | 10 μm | Al | 1 μm | 50% conductive carbon black, 50% aqueous PVDF, with a thickness of 1.5 μm | Same as the above |
| Positive electrode plate 24 | Positive electrode current collector 4 | PET | 10 μm | Al | 1 μm | 65% conductive carbon black, 35% aqueous PVDF, with a thickness of 1.5 μm | Same as the above |
| Positive electrode plate 25 | Positive electrode current collector 4 | PET | 10 μm | Al | 1 μm | 80% conductive carbon black, 20% aqueous PVDF, with a thickness of 1.5 μm | Same as the above |
| Positive electrode plate 26 | Positive electrode current collector 4 | PET | 10 μm | Al | 1 μm | 99% conductive carbon black, 1% aqueous PVDF, with a thickness of 1.5 μm | Same as the above |
| Positive electrode plate 27 | Positive electrode current collector 4 | PET | 10 μm | Al | 1 μm | 65% conductive carbon black, 35% oily PVDF, with a thickness of 1.5 μm | Same as the above |
| Positive electrode plate 28 | Positive electrode current collector 4 | PET | 10 μm | Al | 1 μm | 80% conductive carbon black, 20% oily PVDF, with a thickness of 1.5 μm | Same as the above |
| Positive electrode plate 29 | Positive electrode current collector 4 | PET | 10 μm | Al | 1 μm | 32.5% conductive carbon black, 32.5% flake conductive graphite (D50 0.05 μm), 35% aqueous PVDF, with a thickness of 1.5 μm | Same as the above |
| Positive electrode plate 30 | Positive electrode current collector 4 | PET | 10 μm | Al | 1 μm | 65% conductive carbon black, 35% aqueous PVDF, with a thickness of 500 nm | Same as the above |
| Positive electrode plate 31 | Positive electrode current collector 4 | PET | 10 μm | Al | 1 μm | 65% conductive carbon black, 35% aqueous PVDF, with a thickness of 2 μm | Same as the above |
| Positive electrode plate 32 | Positive electrode current collector 4 | PET | 10 μm | Al | 1 μm | 65% conductive carbon black, 35% aqueous PVDF, with a thickness of 5 μm | Same as the above |

The table below shows measurement results of the performance of the batteries composed of the various electrode plates in the foregoing table.

TABLE 7

| Battery number | Electrode plate | | DCR growth rate |
|---|---|---|---|
| Battery 30 | Comparative positive electrode plate 20 | Conventional negative electrode plate | 35% |
| Battery 31 | Positive electrode plate 21 | Conventional negative electrode plate | 30.9% |
| Battery 32 | Positive electrode plate 22 | Conventional negative electrode plate | 29% |
| Battery 33 | Positive electrode plate 23 | Conventional negative electrode plate | 20% |
| Battery 34 | Positive electrode plate 24 | Conventional negative electrode plate | 15% |
| Battery 35 | Positive electrode plate 25 | Conventional negative electrode plate | 14.5% |
| Battery 36 | Positive electrode plate 26 | Conventional negative electrode plate | 14% |
| Battery 37 | Positive electrode plate 27 | Conventional negative electrode plate | 18.5% |
| Battery 38 | Positive electrode plate 28 | Conventional negative electrode plate | 18.2% |
| Battery 39 | Positive electrode plate 29 | Conventional negative electrode plate | 12.9% |
| Battery 40 | Positive electrode plate 30 | Conventional negative electrode plate | 15.5% |
| Battery 41 | Positive electrode plate 31 | Conventional negative electrode plate | 14.6% |
| Battery 42 | Positive electrode plate 32 | Conventional negative electrode plate | 14.1% |

It can be learned from the above test data that:

1. When a composite current collector with a thin conductive layer (that is, the comparative positive electrode plate 20 without a conductive primer layer) was used, the battery had large DCR and a low cycle capacity retention rate due to shortcomings such as having poorer conductivity than a conventional metal current collector, and damage vulnerability of the conductive layer in the composite current collector. However, after the conductive primer layer was introduced, by effectively mending and constructing a conductive network among the current collector, the conductive primer layer, and the active material, the conductive primer layer helped to improve the electron transfer efficiency, and reduce the resistance between the current collector and the electrode active material layer, so that the DCR could be effectively reduced.

2. With an increase of the conductive agent content of the conductive primer layer (the positive electrode plates 21 to 26), the DCR of the battery could be greatly reduced.

3. Under the same composition, the aqueous binder could help to reduce the DCR more significantly than the oily binder (a positive electrode plate 24 vs. a positive electrode plate 27 and a positive electrode plate 25 vs. a positive electrode plate 28).

4. The flake graphite could generate "horizontal sliding", thereby achieving a function of buffering, reducing the damage to the conductive layer of the current collector during the compaction, and reducing cracks. Therefore, the flake graphite could further reduce the DCR of the battery (a positive electrode plate 24 vs. a positive electrode plate 29).

5. With the increase of the thickness of the conductive primer layer (a positive electrode plate 30 to a positive electrode plate 32), the DCR of the battery could be reduced more significantly. However, a too thick conductive primer layer was not conducive to the improvement of the energy density of the battery.

4.5 Effect of a Percentage of a Binder Contained in an Electrode Active Material Layer on Improvement of Electrochemical Performance of a Battery When the binder content of the electrode active material layer was high, the binding force between the active material layer and the current collector was strong, and when there was the conductive primer layer, the binding force between the entire film layer (that is, a collective term for the active material layer and the conductive primer layer) and the composite current collector was also strong. Therefore, in an abnormal case such as nail penetration, the active material layer (or the film layer) could efficiently wrap the metal fins generated in the conductive layer to improve the nail penetration safety performance of the battery.

The following uses the positive electrode plate as an example to illustrate the effect of the binder content of the electrode active material layer on improvement of the electrochemical performance of the battery from the perspective of the safety of battery nail penetration.

The positive electrode plates were prepared according to the method described in the preceding examples, but the composition of the positive electrode active material layer slurry was adjusted to prepare a plurality of positive electrode plates with different binder contents in the positive electrode active material layer. The specific electrode plate compositions are shown in the table below.

| Electrode plate number | Current collector number | Support layer | | Conductive layer | | Conductive primer layer | Electrode active material layer |
|---|---|---|---|---|---|---|---|
| | | Material | D1 | Material | D2 | | |
| Positive electrode plate 33 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 0.5 wt % binder PVDF |
| Positive electrode plate 34 | Positive electrode current collector 4 | PET | 10 μm | Al | 1 μm | 65% conductive carbon black, 35% aqueous PVDF, with a thickness of 1.5 μm | NCM811, D50 6.5 μm, an active material layer with a thickness of 55 μm, 1 wt % binder PVDF |
| Positive electrode plate 35 | Positive electrode current collector 4 | PET | 10 μm | Al | 1 μm | 65% conductive carbon black, 35% aqueous PVDF, with a thickness | NCM811, D50 6.5 μm, an active material layer with a thickness |

-continued

| Electrode plate number | Current collector number | Support layer Material | D1 | Conductive layer Material | D2 | Conductive primer layer | Electrode active material layer |
|---|---|---|---|---|---|---|---|
| Positive electrode plate 36 | Positive electrode current collector 4 | PET | 10 μm | Al | 1 μm | of 1.5 μm 65% conductive carbon black, 35% aqueous PVDF, with a thickness of 1.5 μm | of 55 μm, 2 wt % binder PVDF NCM811, D50 6.5 μm, an active material layer with a thickness of 55 μm, 3 wt % binder PVDF |

The table below shows nail penetration test results of the batteries assembled by using the foregoing different positive electrode plates. The results show that the higher binder content of the positive electrode active material layer generated better nail penetration safety performance of the corresponding battery. The binder content of the positive electrode active material layer was preferably not less than 1 wt %, more preferably not less than 1.5 wt %, and most preferably, not less than 2 wt %.

TABLE 9

| Battery number | Electrode plate | Nail penetration test result |
|---|---|---|
| Battery 43 | Positive electrode plate 33 | Conventional negative electrode plate | 1 passed, 9 failed |
| Battery 44 | Positive electrode plate 34 | Conventional negative electrode plate | 6 passed, 4 failed |
| Battery 45 | Positive electrode plate 35 | Conventional negative electrode plate | All passed |
| Battery 46 | Positive electrode plate 36 | Conventional negative electrode plate | All passed |

A person skilled in the art may understand that the foregoing shows an application example of an electrode plate in this application only by using a lithium-ion battery as an example. However, the electrode plate in this application may also be applied to another type of electrochemical device or an apparatus including the electrochemical device, and a good technical effect of this application can still be achieved.

According to the disclosure and teaching of this specification, a person skilled in the art of this application may further make appropriate changes or modifications to the foregoing embodiments. Therefore, this application is not limited to the foregoing disclosure and the described embodiments, and some changes or modifications to this application shall also fall within the protection scope of the claims of this application. In addition, although some specific terms are used in this specification, these terms are used only for ease of description, and do not constitute any limitation on this application.

What is claimed is:

1. An electrode plate, comprising a current collector and an electrode active material layer disposed on at least one surface of the current collector, wherein
the current collector comprises a support layer and a conductive layer disposed on at least one surface of the support layer, a single-sided thickness D2 of the conductive layer along a thickness direction satisfies 30 nm≤D2≤3 μm, the support layer is made of a polymer material or polymer composite material, and a thickness D1 of the support layer along the thickness direction satisfies 1 μm≤D1≤30 μm; and
the electrode active material layer comprises an electrode active material, a binder, and a conductive agent,
wherein the electrode plate has a length direction, which is the main dimension direction with a larger magnitude, and a width direction, which is a secondary dimension direction with a smaller magnitude, the length direction and the width direction are perpendicular to the thickness direction of the current collector,
when viewed in the width direction of a coated surface of the electrode plate, the electrode active material layer comprises three zones including a high compacted zone between a first low compacted zone and a second low compacted zone,
a compacted density of the high compacted zone is greater than a compacted density of the first low compacted zone and greater than a compacted density of the second low compacted zone,
a width of the high compacted zone is 30% to 70% of a total width of the three zones.

2. The electrode plate according to claim 1, wherein the thickness D1 of the support layer satisfies 1 μm≤D1≤15 μm.

3. The electrode plate according to claim 1, wherein based on a total weight of the electrode active material layer, a binder content of the electrode active material layer is not less than 1 wt %.

4. The electrode plate according to claim 1, wherein the conductive layer is a metal conductive layer;
a material of the metal conductive layer is selected from at least one of aluminum, copper, nickel, titanium, silver, a nickel-copper alloy, or an aluminum-zirconium alloy; and
the thickness D2 of the conductive layer satisfies 300 nm≤D2≤2 μm.

5. The electrode plate according to claim 1, wherein a material of the support layer is selected from at least one of an insulation polymer material, an insulation polymer composite material, a conductive polymer material, or a conductive polymer composite material;
the insulation polymer material is selected from at least one of polyamide, polyterephthalate, polyimide, polyethylene, polypropylene, polystyrene, polyvinyl chloride, aramid, polydiformylphenylenediamine, acrylonitrile-butadiene-styrene copolymer, polybutylene terephthalate, poly(p-phenylene terephthalamide), ethylene propylene rubber, polyoxymethylene, epoxy resin, phenolic resin, polytetrafluoroethylene, polyphenyl sulfide, polyvinylidene fluoride, silicone rubber, polycarbonate, cellulose and its derivatives, starch and its derivatives, protein and its derivatives, polyvinyl alcohol and its cross-linked products, or polyethylene glycol and its cross-linked products;

the insulation polymer composite material is selected from a composite material formed of an insulation polymer material and an inorganic material, and the inorganic material is at least one of a ceramic material, a glass material, or a ceramic composite material;

the conductive polymer material is selected from a polysulfur nitride polymer material or a doped conjugated polymer material;

the conductive polymer composite material is selected from a composite material formed of an insulation polymer material and a conductive material, the conductive material is selected from at least one of a conductive carbon material, a metal material, or a composite conductive material; the conductive carbon material is selected from at least one of carbon black, carbon nanotube, graphite, acetylene black, or graphene; the metal material is selected from at least one of nickel, iron, copper, aluminum, or alloy of the foregoing metals; and the composite conductive material is selected from at least one of nickel-coated graphite powder, or nickel-coated carbon fiber; and the material of the support layer is an insulation polymer material or an insulation polymer composite material.

6. The electrode plate according to claim 1, wherein a normal temperature Young's modulus E of the support layer satisfies 20 GPa≥E≥4 GPa; and/or there is a crack in the conductive layer.

7. The electrode plate according to claim 1, wherein a protective layer is further disposed on a surface of the conductive layer, the protective layer is disposed only on one surface of the conductive layer of the current collector or disposed on two surfaces of the conductive layer of the current collector, and a thickness D3 of the protective layer satisfies D3≤D2/10 and 1 nm≤D3≤200 nm.

8. The electrode plate according to claim 1, wherein a conductive primer layer comprising a conductive material and a binder is further disposed between the current collector and the electrode active material layer;

the conductive primer layer is different from the electrode active material layer in composition;

a single-sided thickness H of the conductive primer layer is 0.1 μm to 5 μm, and a ratio of H to D2 is 0.5:1 to 5:1; and the binder in the conductive primer layer comprises an aqueous binder.

9. The electrode plate according to claim 1, wherein an average particle size D50 of the electrode active material in the electrode active material layer is 5 μm to 15 μm.

10. An electrochemical device, comprising a positive electrode plate, a negative electrode plate, a separator, and an electrolyte, wherein the positive electrode plate and/or the negative electrode plate is the electrode plate according to claim 1.

11. An apparatus, comprising the electrochemical device according to claim 10.

12. The electrode plate according to claim 1, wherein the width of the high compacted zone is 40% to 60% of the total width of the three zones.

13. The electrode plate according to claim 12, wherein the width of the high compacted zone is 45% to 55% of the total width of the three zones.

14. The electrode plate according to claim 1, wherein the compacted density of the first low compacted zone the compacted density of the second low compacted zone are lower than the compacted density of the high compacted zone by 5% to 30%.

15. The electrode plate according to claim 14, wherein the compacted density of the first low compacted zone the compacted density of the second low compacted zone are lower than the compacted density of the high compacted zone by 8% to 20%.

* * * * *